US011972736B2

(12) United States Patent
In et al.

(10) Patent No.: US 11,972,736 B2
(45) Date of Patent: Apr. 30, 2024

(54) SCAN DRIVER

(71) Applicant: Samsung Display Co., Ltd., Yongin-Si (KR)

(72) Inventors: Haijung In, Yongin-si (KR); Dongeup Lee, Yongin-si (KR); Jaesic Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/134,545

(22) Filed: Apr. 13, 2023

(65) Prior Publication Data

US 2023/0377523 A1 Nov. 23, 2023

(30) Foreign Application Priority Data

May 19, 2022 (KR) ........................ 10-2022-0061652

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2310/0286* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 7,859,507 B2 * | 12/2010 | Jang | G11C 19/28 377/64 |
| 9,218,074 B2 | 12/2015 | Cho et al. | |
| 10,152,910 B2 | 12/2018 | Yoon et al. | |
| 10,170,029 B2 | 1/2019 | You et al. | |
| 10,453,386 B2 | 10/2019 | Jang | |
| 10,672,357 B2 | 6/2020 | Lee et al. | |
| 10,741,123 B2 | 8/2020 | Moon et al. | |
| 2013/0321032 A1 * | 12/2013 | Chung | H03K 3/00 327/108 |
| 2017/0345366 A1 | 11/2017 | Jang | |
| 2020/0184898 A1 * | 6/2020 | Choi | G09G 3/3233 |
| 2022/0020332 A1 | 1/2022 | Yang et al. | |
| 2022/0036824 A1 | 2/2022 | Lee et al. | |

FOREIGN PATENT DOCUMENTS

| | | |
|---|---|---|
| KR | 10-2017-0030714 A | 3/2017 |
| KR | 10-2018-0049479 A | 5/2018 |
| KR | 10-2018-0072041 A | 6/2018 |
| KR | 10-2019-0073111 A | 6/2019 |
| KR | 10-2005938 B1 | 10/2019 |
| KR | 10-2020-0061448 A | 6/2020 |
| KR | 10-2020-0075955 A | 6/2020 |
| KR | 10-2244015 B1 | 4/2021 |

* cited by examiner

*Primary Examiner* — Parul H Gupta
(74) *Attorney, Agent, or Firm* — Innovation Counsel LLP

(57) ABSTRACT

Provided is a scan driver including a plurality of stages. Each stage includes a node controller in which a transistor having a gate connected to a first control node and a transistor having a gate connected to a second control node are coupled to each other. Accordingly, a stable scan signal is output without a separate boost capacitor.

20 Claims, 21 Drawing Sheets

SCAN DRIVER

CROSS-REFERENCE TO RELATED APPLICATION

This application is based on and claims priority under 35 U.S.C. § 119 to Korean Patent Application No. 10-2022-0061652, filed on May 19, 2022, in the Korean Intellectual Property Office, the disclosure of which is incorporated by reference herein in its entirety.

BACKGROUND

1. Field

The present disclosure generally relates to a scan driver and a display device including the same. More particularly, the present disclosure relates to a scan driver capable of stably outputting scan signals, and a display device including the same.

2. Description of the Related Art

Display devices include a pixel portion including a plurality of pixels, a scan driver, a data driver, and a controller. The scan driver includes stages connected to scan lines, and the stages supply a scan signal to a scan line connected to its own stage in response to signals from the controller.

SUMMARY

One or more embodiments include a scan driver capable of stably outputting scan signals, and a display device including the same. Technical objectives to be achieved by the disclosure are not limited to the above-mentioned technical objectives, and other technical objectives that are not mentioned will be clearly understood by those of ordinary skill in the art.

Additional aspects will be set forth in part in the description which follows and, in part, will be apparent from the description, or may be learned by practice of the presented embodiments of the disclosure.

According to one or more embodiments, a scan driver includes a plurality of stages, wherein each of the plurality of stages includes a first node controller connected between an input terminal to which a start signal is applied and a first control node and configured to control a voltage level of the first control node by a clock signal, a second node controller configured to control a voltage level of a second control node according to the voltage level of the first control node, and an output controller configured to output an output signal having a first voltage level or a second voltage level according to the voltage level of the second control node. The second node controller includes a first control transistor connected between a first voltage input terminal, to which a first voltage of a first voltage level is applied, and a first node and having a gate connected to the second control node, a second control transistor connected between a second voltage input terminal, to which a second voltage of a second voltage level is applied, and the first node and having a first gate connected to the second control node, a third control transistor connected between the first voltage input terminal and the second control node and having a gate connected to the first control node, and a fourth control transistor connected between the second voltage input terminal and the second control node and having a first gate connected to the first control node.

A second gate of the fourth control transistor may be connected to a third voltage input terminal to which a third voltage of a second voltage level is applied, a second gate of the second control transistor may be connected to a fourth voltage input terminal to which a fourth voltage of a second voltage level is applied, and the third voltage may be greater or less than the second voltage.

The fourth voltage may vary with time.

The first node controller may include a fifth control transistor connected between the input terminal and the first control node and having a gate connected to a first clock terminal, a sixth control transistor connected between the input terminal and the first control node and having a first gate connected to a second clock terminal, a seventh control transistor connected between the first node and a second node connected to the first control node and having a first gate connected to the first clock terminal, and an eighth control transistor connected between the first node and the second node and having a gate connected to the second clock terminal.

A second gate of the sixth control transistor and a second gate of the seventh control transistor may be connected to a third voltage input terminal to which a third voltage of a second voltage level is applied, and the third voltage may be greater or less than the second voltage.

An inversion timing of a first clock signal applied to the first clock terminal may coincide with an inversion timing of a second clock signal applied to the second clock terminal.

The first node controller may include a fifth control transistor connected between the input terminal and the first control node and having a gate connected to a clock terminal, a sixth control transistor connected between the input terminal and the first control node and having a first gate connected to a third node, a seventh control transistor connected between the first node and a second node connected to the first control node and having a first gate connected to the clock terminal, an eighth control transistor connected between the first node and the second node and having a gate connected to the third node, a ninth control transistor connected between the first voltage input terminal and the third node and having a gate connected to the clock terminal, and a tenth control transistor connected between the second voltage input terminal and the third node and having a first gate connected to the clock terminal.

A second gate of the sixth control transistor, a second gate of the seventh control transistor, and a second gate of the tenth control transistor may be connected to a third voltage input terminal to which a third voltage of a second voltage level is applied, and the third voltage may be greater or less than the second voltage.

The output signal may have a first voltage level at a timing when a clock signal applied to the clock terminal transitions from a first voltage level to a second voltage level.

The first node controller may include a fifth control transistor connected between the input terminal and the first control node and having a gate connected to a third node, a sixth control transistor connected between the input terminal and the first control node and having a first gate connected to a clock terminal, a seventh control transistor connected between the first node and a second node connected to the first control node and having a first gate connected to the third node, an eighth control transistor connected between the first node and the second node and having a gate connected to the clock terminal, a ninth control transistor connected between the first voltage input terminal and the third node and having a gate connected to the clock terminal, and a tenth control transistor connected between the second voltage input terminal and the third node and having a first gate connected to the clock terminal.

A second gate of the sixth control transistor, a second gate of the seventh control transistor, and a second gate of the tenth control transistor may be connected to a third voltage input terminal to which a third voltage of a second voltage level is applied, and the third voltage may be greater or less than the second voltage.

The output signal may have a first voltage level at a timing when a clock signal applied to the clock terminal transitions from a second voltage level to a first voltage level.

A carry output terminal may be connected to the first node.

The output controller may include a pull-up transistor connected between the first voltage input terminal and an output terminal and having a gate connected to the second control node, and a pull-down transistor connected between the second voltage input terminal and the output terminal and having a first gate connected to the second control node and a second gate connected to a fourth voltage input terminal to which a fourth voltage of a second voltage level is applied.

According to one or more embodiments, a scan driver includes a plurality of stages, wherein each of the plurality of stages includes a first node controller connected between a first voltage input terminal, to which a first voltage of a first voltage level is applied, and a second voltage input terminal, to which a second voltage of a second voltage level is applied, and configured to control voltage levels of a first control node and a second control node by using a start signal applied to an input terminal, a second node controller configured to control a voltage level of a third control node according to the voltage level of the first control node, and an output controller configured to output an output signal having a first voltage level or a second voltage level according to the voltage level of the third control node. The second node controller includes a first control transistor connected between the first voltage input terminal and the first control node and having a gate connected to the second control node, a second control transistor connected between the second voltage input terminal and the first control node and having a first gate connected to the second control node, a third control transistor connected between the first voltage input terminal and the third control node and having a gate connected to the first control node, and a fourth control transistor connected between the second voltage input terminal and the third control node and having a first gate connected to the first control node.

A second gate of the fourth control transistor may be connected to a third voltage input terminal to which a third voltage of a second voltage level is applied, a second gate of the second control transistor may be connected to a fourth voltage input terminal to which a fourth voltage of a second voltage level is applied, and the third voltage may be less than the second voltage and the fourth voltage may vary with time.

The first node controller may include a fifth control transistor connected between the first voltage input terminal and a first node and having a gate connected to the input terminal, a sixth control transistor connected between the first node and the second control node and having a gate connected to a first clock terminal, a seventh control transistor connected between the second control node and a second node and having a first gate connected to a second clock terminal, an eighth control transistor connected between the second node and the second voltage input terminal and having a first gate connected to the input terminal, a ninth control transistor connected between the first voltage input terminal and a third node and having a gate connected to the first control node, a tenth control transistor connected between the third node and the second control node and having a gate connected to the second clock terminal, an eleventh control transistor connected between the second control node and a fourth node and having a first gate connected to the first clock terminal, and a twelfth control transistor connected between the second voltage input terminal and the fourth node and having a first gate connected to the first control node.

A second gate of the seventh control transistor, a second gate of the eighth control transistor, a second gate of the eleventh control transistor, and a second gate of the twelfth control transistor may be connected to a third voltage input terminal to which a third voltage of a second voltage level is applied, and the third voltage may be less than the second voltage.

The first node controller may include a fifth control transistor connected between the first voltage input terminal and a first node and having a gate connected to a first clock terminal, a sixth control transistor connected between the first node and the second control node and having a gate connected to the input terminal, a seventh control transistor connected between the second control node and a second node and having a first gate connected to the input terminal, an eighth control transistor connected between the second node and the second voltage input terminal and having a first gate connected to a second clock terminal, a ninth control transistor connected between the first voltage input terminal and a third node and having a gate connected to the second clock terminal, a tenth control transistor connected between the third node and the second control node and having a gate connected to the first control node, an eleventh control transistor connected between the second control node and a fourth node and having a first gate connected to the first control node, and a twelfth control transistor connected between the second voltage input terminal and the fourth node and having a first gate connected to the first clock terminal.

A second gate of the seventh control transistor, a second gate of the eighth control transistor, a second gate of the eleventh control transistor, and a second gate of the twelfth control transistor may be connected to a fourth voltage input terminal to which a fourth voltage of a second voltage level is applied, and the fourth voltage may vary with time.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
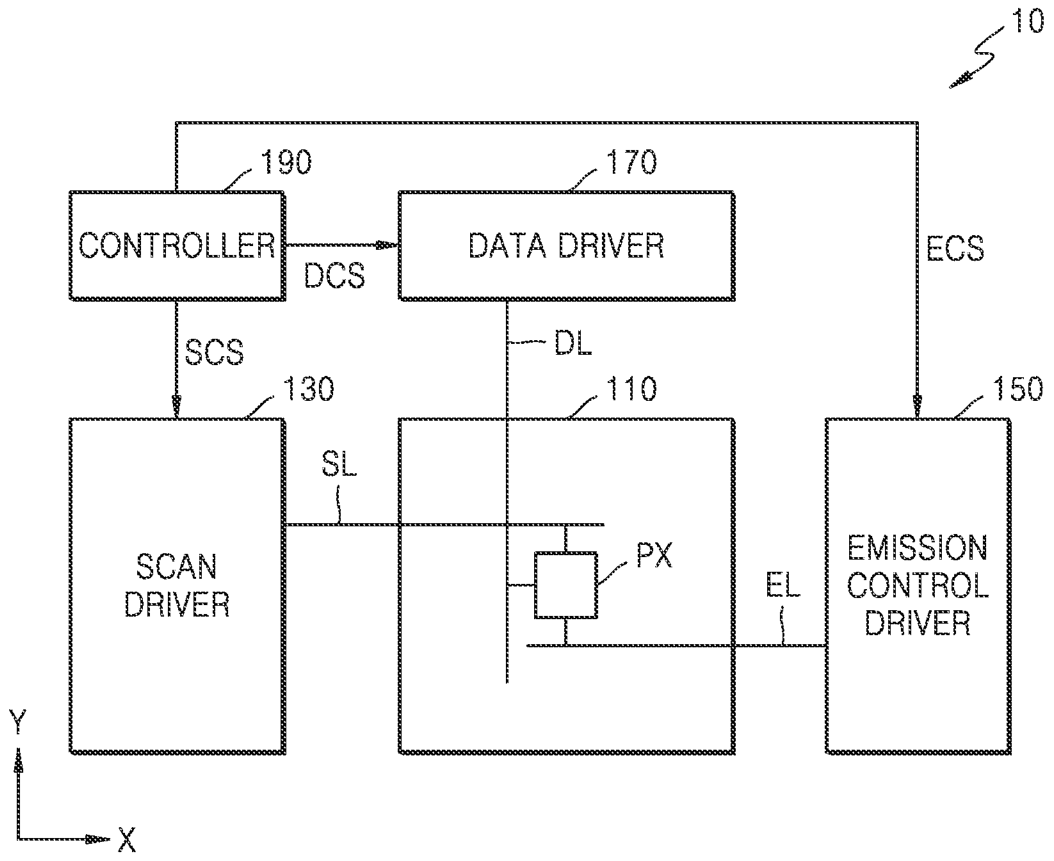
FIG. 1 is a schematic diagram illustrating a display device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. The attached drawings for illustrating one or more embodiments are referred to in order to gain a sufficient understanding, the merits thereof, and the objectives accomplished by the implementation. However, the embodiments may have different forms and should not be construed as being limited to the descriptions set forth herein.

It will be understood that although the terms "first," "second," etc. may be used herein to describe various elements, these elements should not be limited by these terms. These terms are only used to distinguish one element from another.

As used herein, the singular forms "a," "an," and "the" are intended to include the plural forms as well, unless the context clearly indicates otherwise.

It will be further understood that the terms "includes," "has," "including," and/or "having" used herein specify the presence of stated features or elements, but do not preclude the presence or addition of one or more other features or elements.

It will be understood that when a layer, region, or element is referred to as being "formed on" another layer, region, or element, it can be directly or indirectly formed on the other layer, region, or element. That is, for example, intervening layers, regions, or elements may be present.

Sizes of elements in the drawings may be exaggerated for convenience of explanation. In other words, since sizes and thicknesses of elements in the drawings are arbitrarily illustrated for convenience of explanation, the following embodiments are not limited thereto.

In the present specification, an expression such as "A and/or B" indicates A, B, or A and B. Also, an expression such as "at least one of A and B" indicates A, B, or A and B.

In the following embodiments, when X and Y are connected to each other, there may cases where X and Y are electrically connected to each other, X and Y are functionally connected to each other and X and Y are connected directly to each other. Here, X and Y may be an object (e.g., an apparatus, a device, a circuit, a wiring, an electrode, a terminal, a conductive layer, a layer, etc.). Thus, it is not limited to a certain connection relationship, for example, a connection relationship indicated in the drawings or a detailed description and may include a connection relationship other than a connection relationship indicated in the drawings or a detailed description.

When X and Y are electrically connected to each other, for example, there may be a case where one or more elements (e.g., a switch, a transistor, a capacitive element, an inductor, a resistive element, a diode, etc.) for enabling an electrical connection of X and Y are connected between X and Y.

In the following embodiments, "ON" used in association with a state of a device may refer to an activated state of a device, and "OFF" used in association with the state of the device may refer to an inactive state of the device. "ON" used in association with a signal received by the device may refer to a signal for activating the device, and "OFF" used in association with the signal received by the device may refer to a signal for deactivating the device. The device may be activated by a high-level voltage or low-level voltage. For example, a P-type transistor (P-channel transistor) may be configured to be activated by the low-level voltage, and an N-type transistor (N-channel transistor) may be configured to be activated by the high-level voltage. Thus, it is to be understood that the "on" voltage for the P-type transistor and the "on" voltage for the N-type transistor are at opposite (low vs. high) voltage levels. Hereinafter, a voltage for activating (turning on) a transistor is referred to as an on voltage, and a voltage for non-activating (turning off) the transistor is referred to as an off voltage. A period in which the on voltage of a signal is maintained is referred to as an on voltage period, and a period in which the off voltage of the signal is maintained is referred to as an off voltage period.

FIG. 1 is a schematic diagram illustrating a display device according to an embodiment.

A display device 10 according to an embodiment may be a display device, such as an organic light-emitting display device, an inorganic light-emitting display device (or an inorganic electroluminescence (EL) display device), or a quantum dot light-emitting display device.

Referring to FIG. 1, the display device 10 according to an embodiment may include a pixel portion 110, a scan driver 130, an emission control driver 150, a data driver 170, and a controller 190.

A plurality of pixels PX and signal lines for applying an electrical signal to the plurality of pixels PX may be arranged in the pixel portion 110. The pixel portion 110 may be a display area in which an image is displayed.

The plurality of pixels PX may be repeatedly arranged in a first direction (X-direction or row-direction) and a second direction (Y-direction or a column direction). The plurality of pixels PX may be arranged in various shapes, such as a stripe arrangement, PenTile® arrangement, and a mosaic arrangement, to implement an image. Each of the plurality of pixels PX may include an organic light-emitting diode as a display element, and the organic light-emitting diode may be connected to a pixel circuit. The pixel circuit may include a plurality of transistors and at least one capacitor.

The signal lines for applying an electrical signal to the plurality of pixels PX may include a plurality of scan lines SL extending in the first direction, a plurality of emission control lines EL extending in the first direction, and a plurality of data lines DL extending in the second direction. The plurality of scan lines SL may be apart from each other in the second direction and may be configured to transmit a scan signal to the pixels PX. The plurality of emission control lines EL may be apart from each other in the second direction and may be configured to transmit an emission control signal to the pixels PX. The plurality of data lines DL may be apart from each other in the first direction and may be configured to transmit a data signal to the pixels PX. Each of the plurality of pixels PX may be connected to at least one corresponding scan line among the plurality of scan lines SL, a corresponding emission control line among the plurality of emission control lines EL, and a corresponding data line among the plurality of data lines DL.

In FIG. 1, the pixel PX is connected to one scan line SL. However, this is only an example, and the pixel PX may be connected to a plurality of scan lines SL. In an embodiment, at least one scan line connected to each pixel PX may include at least one of a first scan line SCL1, a second scan line SCL2, a third scan line SCL3, and a fourth scan lines SCL4 shown in FIG. 2.

The scan driver 130 may be connected to the plurality of scan lines SL, generate scan signals in response to a control signal SCS from the controller 190, and sequentially supply the scan signals to the scan lines SL. The scan signal may be a gate control signal for controlling turn-on and turn-off of a transistor included in the pixel PX. The scan signal may be a square wave signal in which an on voltage for turning on a transistor included in the pixel PX and an off voltage for turning off the transistor are repeated. In an embodiment, the on voltage may be a high-level voltage (hereinafter, referred to as a 'high voltage') or a low-level voltage (hereinafter, referred to as a 'low voltage'). The on voltage period and the off voltage period of the scan signal may be determined according to a function of a transistor receiving the scan signal in the pixel PX. The scan driver 130 may include a shift register (or stage) for sequentially generating and outputting scan signals.

The emission control driver 150 may be connected to the plurality of emission control lines EL, generate the emission control signals in response to a control signal ECS from the controller 190, and sequentially supply the emission control signals to the emission control lines EL. The emission control signal may be a gate control signal for controlling turn-on and turn-off of a transistor included in the pixel PX. The emission control signal may be a square wave signal in which an on voltage for turning on a transistor included in the pixel PX and an off voltage for turning off the transistor are repeated. The emission control driver 150 may include a shift register (or stage) for sequentially generating and outputting emission control signals.

The data driver 170 may be connected to the plurality of data lines DL and supply data signals to the data lines DL in response to a control signal DCS from the controller 190. The data signal supplied to the data line DL may be supplied to the pixels PX to which the scan signal is supplied. To this end, the data driver 170 may supply the data signal to the data line DL to be synchronized with the scan signal.

The controller 190 may generate the control signal SCS, the control signal ECS, and the control signal DCS based on signals input from the outside. The controller 190 may supply the control signal SCS to the scan driver 130, the control signal ECS to the emission control driver 150, and the control signal DCS to the data driver 170.

In an embodiment, the plurality of transistors included in the pixel circuit may be N-type oxide thin-film transistors. In the oxide thin-film transistors, an active pattern (semiconductor layer) may include an oxide.

In an embodiment, some of the plurality of transistors included in the pixel circuit may be N-type oxide thin-film transistors, and some others may be P-type silicon thin-film transistors. In the silicon thin-film transistors, an active pattern (semiconductor layer) may include amorphous silicon, poly silicon, or the like.

Figure 2:
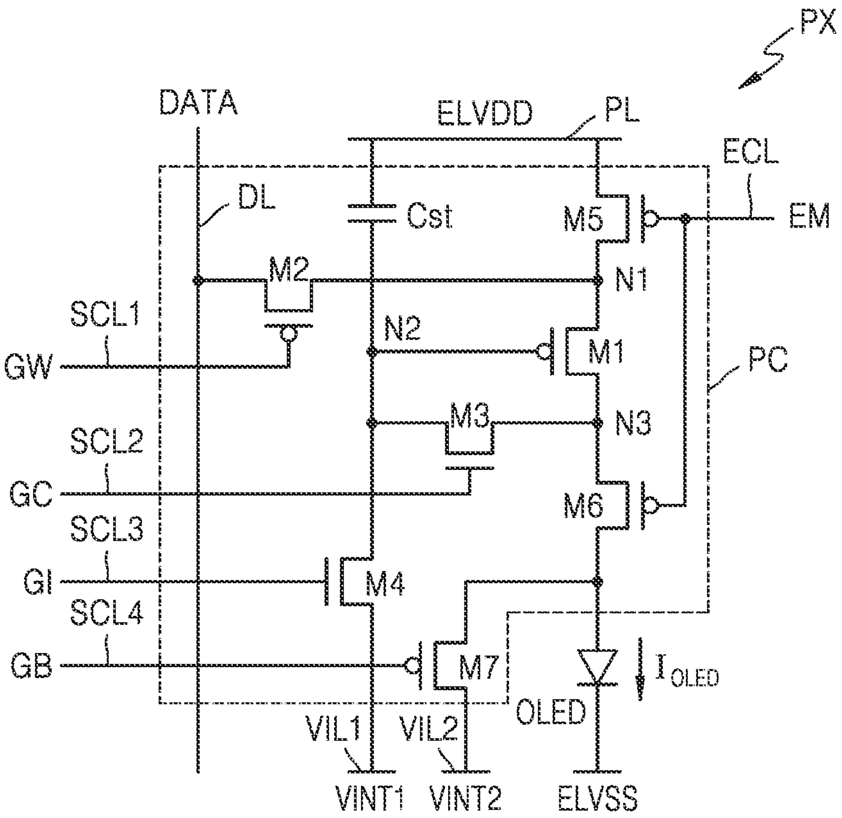
FIG. 2 is an equivalent circuit diagram illustrating a pixel according to an embodiment.

FIG. 2 is an equivalent circuit diagram illustrating a pixel according to an embodiment.

Referring to FIG. 2, the pixel PX includes a pixel circuit PC and an organic light-emitting diode OLED as a display element connected to the pixel circuit PC. The pixel circuit PC includes a plurality of transistors, i.e., first to seventh transistors M1 to M7, a capacitor Cst, signal lines connected to the first to seventh transistors M1, M2, M3, M4, M5, M6, and M7, first and second initialization voltage lines VIL1 and VIL2, and a driving voltage line PL. The signal lines may include a data line DL, a first scan line SCL1, a second scan line SCL2, a third scan line SCL3, a fourth scan line SCL4, and an emission control line ECL.

The first transistor M1 may be a driving transistor, and the second to seventh transistors M2, M3, M4, M5, M6, and M7 may be switching transistors. A first terminal of each of the first to seventh transistors M1, M2, M3, M4, M5, M6, and M7 may be a source terminal or a drain terminal according to the type of transistor (P-type or N-type) and/or operating conditions, and a second terminal of each of the first to seventh transistors M1, M2, M3, M4, M5, M6, and M7 may be a terminal that is different from the first corresponding terminal. For example, when the first terminal is a source terminal, the second terminal may be a drain terminal. In an embodiment, the source terminal and the drain terminal may be referred to as a source electrode and a drain electrode, respectively.

The driving voltage line PL may be configured to transmit a first power voltage ELVDD to the first transistor M1. The first power voltage ELVDD may be a high voltage applied to a first electrode (pixel electrode or anode) of the organic light-emitting diode OLED included in the pixel PX. The first initialization voltage line VIL1 may be configured to transmit a first initialization voltage VINT1 for initializing the first transistor M1 (e.g., initializing a gate of the first transistor M1) to the pixel PX. The second initialization voltage line VIL2 may be configured to transmit a second initialization voltage VINT2 for initializing the organic light-emitting diode OLED to the pixel PX.

In FIG. 2, the third transistor M3 and the fourth transistor M4 among the first to seventh transistors M1, M2, M3, M4, M5, M6, and M7 are implemented as N-channel MOSFETs (NMOSs), and the rest are implemented as P-channel MOSFETs (PMOSs).

The first transistor M1 may be connected between the driving voltage line PL and the organic light-emitting diode OLED. The first transistor M1 may be connected to the driving voltage line PL via the fifth transistor M5, and may be electrically connected to the organic light-emitting diode OLED via the sixth transistor M6. The first transistor M1 includes a gate connected to a second node N2, a first terminal connected to a first node N1, and a second terminal connected to a third node N3. The first transistor M1 may be configured to receive a data signal according to a switching operation of the second transistor M2 and supply a driving current to the organic light-emitting diode OLED.

The second transistor M2 (data writing transistor) may be connected between the data line DL and the first node N1, and may be connected to the driving voltage line PL via the fifth transistor M5. The first node N1 may be a node to which the first transistor M1 and the fifth transistor M5 are connected. The second transistor M2 includes a gate connected to the first scan line SCL1, a first terminal connected to the data line DL, and a second terminal connected to the first node N1 (or the first terminal of the first transistor M1). The second transistor M2 may be configured to be turned on according to a first scan signal GW received through the first scan line SCL1 and perform a switching operation of transferring the data signal received through the data line DL to the first node N1.

The third transistor M3 (compensation transistor) may be connected between the second node N2 and the third node N3. The third transistor M3 may be connected to the organic light-emitting diode OLED via the sixth transistor M6. The second node N2 may be a node to which the gate of the first transistor M1 is connected, and the third node N3 may be a node to which the first transistor M1 and the sixth transistor M6 are connected. The third transistor M3 includes a gate connected to the second scan line SCL2, a first terminal connected to the second node N2 (or the gate of the first transistor M1), and a second terminal connected to the third node N3 (or the second terminal of the first transistor M1). The third transistor M3 may be configured to be turned on according to a second scan signal GC received through the second scan line SCL2 and diode-connect the first transistor M1 to thereby compensate for a threshold voltage of the first transistor M1.

The fourth transistor M4 (first initialization transistor) may be connected between the second node N2 and the first initialization voltage line VIL1. The fourth transistor M4 includes a gate connected to the third scan line SCL3, a first terminal connected to the second node N2, and a second terminal connected to the first initialization voltage line VIL1. The fourth transistor M4 may be configured to be turned on according to a third scan signal GI received through the third scan line SCL3 and transfer the first initialization voltage VINT1 to the gate of the first transistor M1 to thereby initialize the gate of the first transistor M1.

The fifth transistor M5 (first emission control transistor) may be connected between the driving voltage line PL and the first node N1. The sixth transistor M6 (second emission control transistor) may be connected between the third node N3 and the organic light-emitting diode OLED. The fifth transistor M5 includes a gate connected to the emission control line ECL, a first terminal connected to the driving voltage line PL, and a second terminal connected to the first node N1. The sixth transistor M6 includes a gate connected to the emission control line ECL, a first terminal connected to the third node N3, and a second terminal connected to the pixel electrode of the organic light-emitting diode OLED. The fifth transistor M5 and the sixth transistor M6 may be configured to be simultaneously turned on according to an emission control signal EM received through the emission control line ECL, and thus, a driving current may flow through the organic light-emitting diode OLED.

The seventh transistor M7 (second initialization transistor) may be connected between the organic light-emitting diode OLED and the second initialization voltage line VIL2. The seventh transistor M7 includes a gate connected to the fourth scan line SCL4, a first terminal connected to the second terminal of the sixth transistor M6 and the pixel electrode of the organic light-emitting diode OLED, and a second terminal connected to the second initialization voltage line VIL2. The seventh transistor M7 may be configured to be turned on according to a fourth scan signal GB received through the fourth scan line SCL4 and transfer the second initialization voltage VINT2 to the pixel electrode of the organic light-emitting diode OLED to thereby initialize the organic light-emitting diode OLED. However, in another embodiment, the seventh transistor M7 may be omitted.

The capacitor Cst may include a first electrode and a second electrode. The first electrode may be connected to the gate of the first transistor M1, and the second electrode may be connected to the driving voltage line PL. The capacitor Cst may maintain a voltage applied to the gate of the first transistor M1 by storing and maintaining a voltage corresponding to a voltage difference between the driving voltage line PL and the gate of the first transistor M1.

The organic light-emitting diode OLED includes the pixel electrode and an opposite electrode, and the opposite electrode may receive a second power voltage ELVSS. The second power voltage ELVSS may be a low voltage applied to a second electrode (the opposite electrode or a cathode) of the organic light-emitting diode OLED. The organic light-emitting diode OLED receives a driving current $I_{OLED}$ from the first transistor M1 and emits light to display an image. The first power voltage ELVDD and the second power voltage ELVSS are driving voltages for emitting light from a plurality of pixels PX.

The pixel PX may operate in a non-emission period and an emission period during one frame period. The frame period may be a period for displaying one frame image. The non-emission period may include an initialization period in which the fourth transistor M4 is turned on to initialize a gate of the first transistor M1, a data writing period in which the second transistor M2 is turned on and a data signal is supplied to the pixel PX, a compensation period in which the third transistor M3 is turned on and the threshold voltage of the first transistor M1 is compensated, and a reset period in which the seventh transistor M7 is turned on to initialize the organic light-emitting diode OLED. The emission period may be a period in which the fifth transistor M5 and the sixth transistor M6 are turned on and the organic light-emitting diode OLED emits light. The emission period may be longer than each of the initialization period, data writing period, compensation period, and reset period of the non-emission period.

In the present embodiment, at least one of the plurality of transistors, i.e., the first to seventh transistors M1, M2, M3, M4, M5, M6, and M7, includes a semiconductor layer having an oxide, and the other transistors include a semiconductor layer having silicon. Specifically, the first transistor M1 (driving transistor) that directly affects the brightness of the display device may include a semiconductor layer made of polycrystalline silicon having high reliability, thereby realizing a high-resolution display device.

Because oxide semiconductor has high carrier mobility and low leakage current, the voltage drop is not large even though a driving time is long. That is, because the color change of an image according to the voltage drop is not large even during low-frequency driving, low-frequency driving is possible. Because the oxide semiconductor has low leakage current as described above, at least one of the third transistor M3 and the fourth transistor M4 connected to the gate of the first transistor M1 may be formed by using the oxide semiconductor to thereby prevent leakage current flowing to the gate of the first transistor M1 and reduce power consumption.

Figure 3:
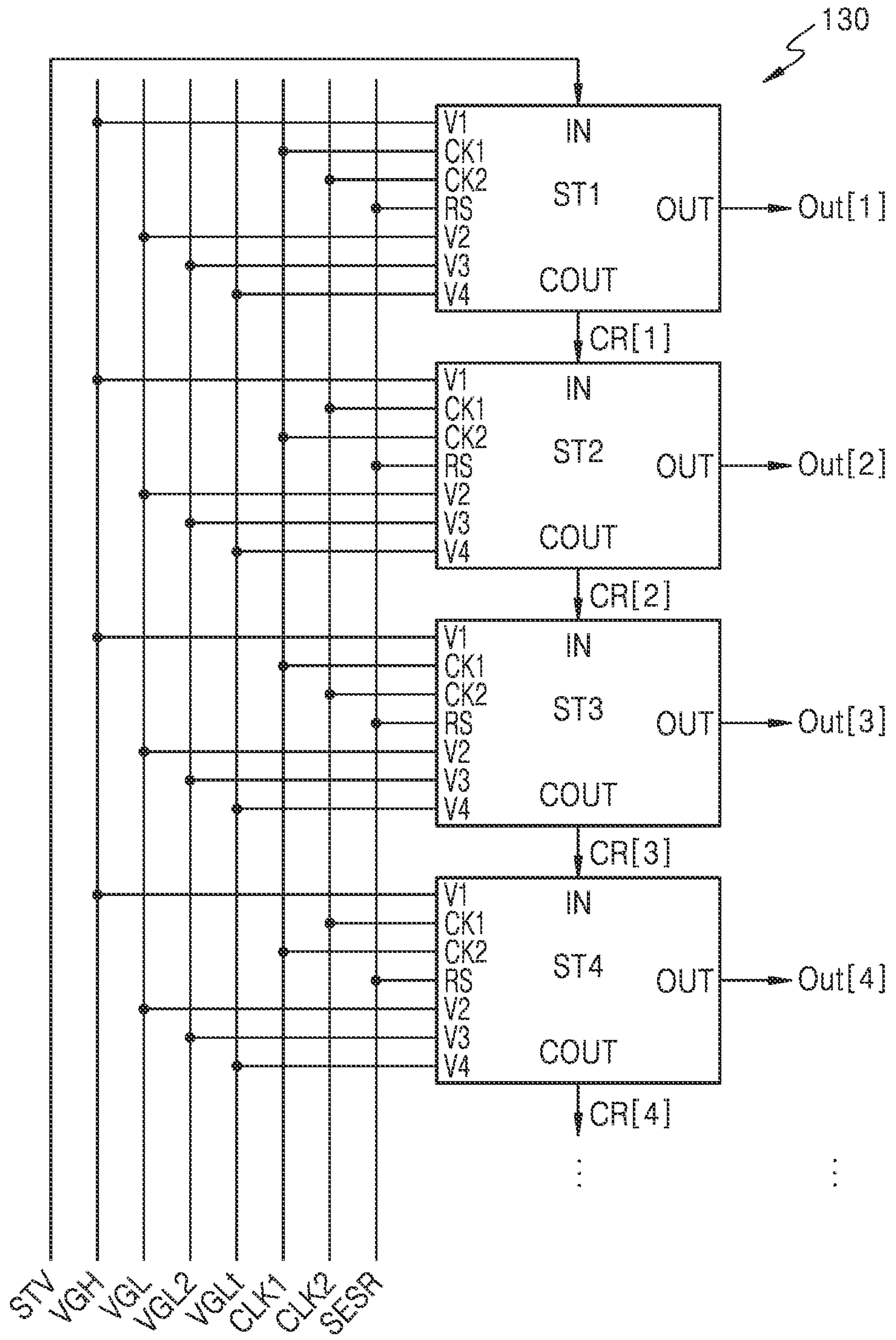
FIG. 3 is a schematic diagram illustrating a scan driver according to an embodiment.
Figure 4:
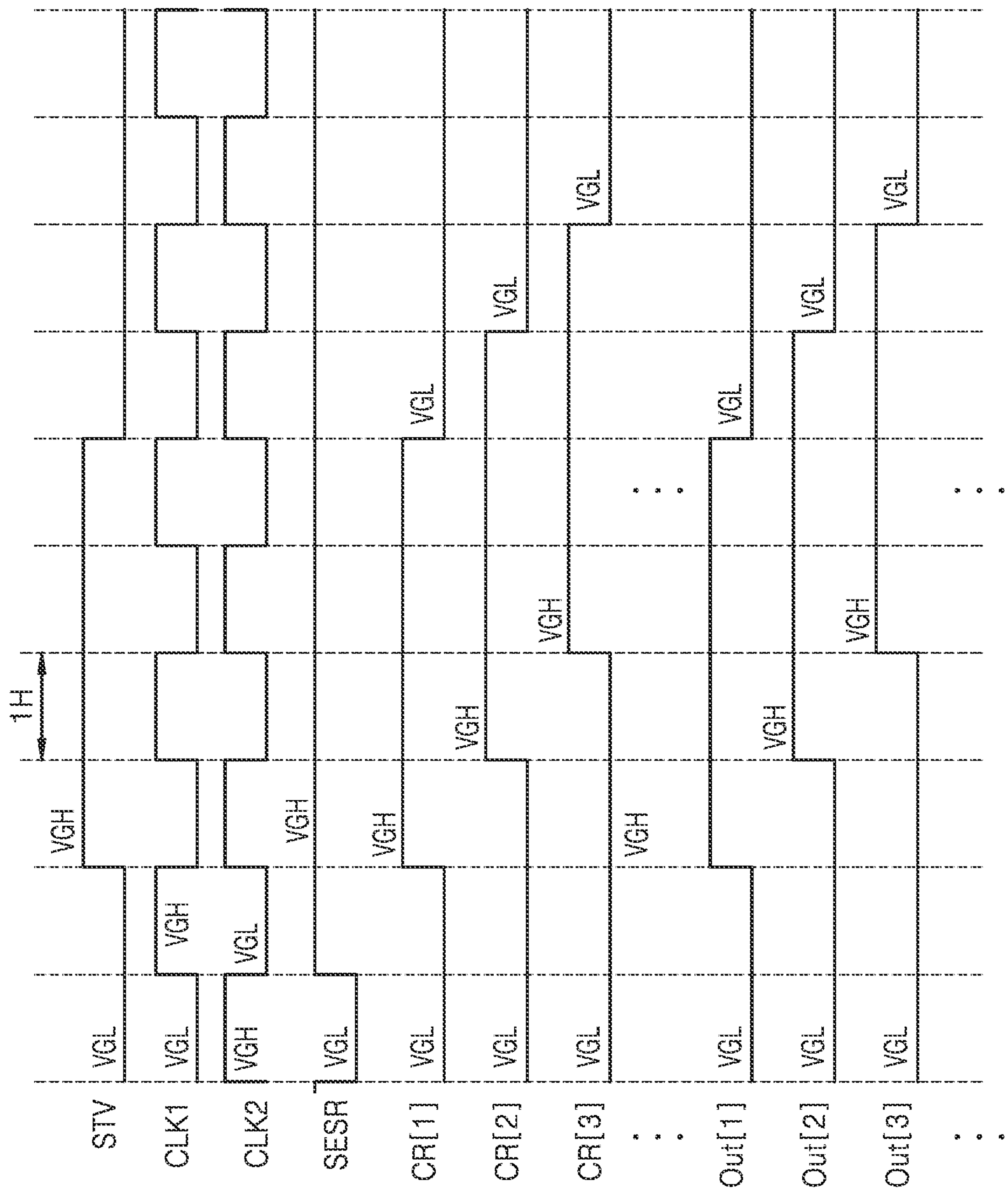
FIG. 4 is a diagram illustrating timings of input/output signals of the scan driver of FIG. 3.

FIG. 3 is a schematic diagram illustrating a scan driver 130 according to an embodiment. FIG. 4 is a diagram illustrating timings of input/output signals of the scan driver 130 of FIG. 3.

Referring to FIG. 3, the scan driver 130 may include a plurality of stages ST1, ST2, ST3, ST4, . . . . Each of the stages ST1, ST2, ST3, ST4, . . . may correspond to a pixel row (pixel line) provided in the pixel portion 110. The number of stages of the scan driver 130 may be variously modified according to the number of pixel rows.

The plurality of stages ST1, ST2, ST3, ST4, . . . may respectively output a plurality of output signals Out[1], Out[2], Out[3], Out[4], . . . in response to a start signal. An output signal output by each of the stages ST1, ST2, ST3, ST4, . . . may be a gate control signal for controlling the turn-on and turn-off of an N-type transistor. For example, an output signal output by each of the stages ST1, ST2, ST3, ST4, . . . may be the second scan signal GC (see FIG. 2) applied to the second scan line SCL2 or the third scan signal GI (see FIG. 2) applied to the third scan line SCL3.

Each of the stages ST1, ST2, ST3, ST4, . . . may include an input terminal IN, a first clock terminal CK1, a second clock terminal CK2, a first voltage input terminal V1, a second voltage input terminal V2, a third voltage input terminal V3, a fourth voltage input terminal V4, a reset terminal RS, an output terminal OUT, and a carry output terminal COUT.

The input terminal IN may receive an external signal STV or a carry signal output from a previous stage as a start signal. In an embodiment, the external signal STV may be applied to the input terminal IN of a first stage ST1, and the carry signal (a previous carry signal) output from the previous stage may be applied to the input terminal IN from the second stage ST2 to a final stage. Here, the previous carry signal may be a carry signal output from an immediately adjacent previous stage. For example, the first stage ST1 may start driving in response to the external signal STV, and a carry signal CR[1] output from the first stage ST1 may be input to the input terminal IN of a second stage ST2.

A first clock signal CLK1 or a second clock signal CLK2 may be applied to the first clock terminal CK1 and the second clock terminal CK2. The first clock signal CLK1 and the second clock signal CLK2 may be alternately applied to the stages ST1, ST2, ST3, ST4, . . . . For example, the first clock signal CLK1 may be applied to the first clock terminal CK1 of an odd-numbered stage, and the second clock signal CLK2 may be applied to the second clock terminal CK2 of the odd-numbered stage. In addition, the second clock signal CLK2 may be applied to the first clock terminal CK1 of an even-numbered stage, and the first clock signal CLK1 may be applied to the second clock terminal CK2 of the even-numbered stage.

As shown in FIG. 4, each of the first clock signal CLK1 and the second clock signal CLK2 may be a square wave signal in which a first voltage VGH having a high level and a second voltage VGL having a low level are repeated. The first clock signal CLK1 and the second clock signal CLK2 may be signals having the same waveform and shifted in phase. For example, the second clock signal CLK2 may have the same waveform as the first clock signal CLK1 and may be applied with a phase shift (phase delay) from the first clock signal CLK1 at a certain interval (one horizontal time period 1H). The start timing and the end timing of the high voltage of the first clock signal CLK1 may coincide with the start timing and the end timing of the low voltage of the second clock signal CLK2, respectively. That is, the timing at which the voltage level of the first clock signal CLK1 is inverted may be the same as the timing at which the voltage level of the second clock signal CLK2 is inverted. The high voltage period and the low voltage period of the first clock signal CLK1 may overlap the low voltage period and the high voltage period of the second clock signal CLK2, respectively.

The first voltage input terminal V1 may receive the first voltage VGH that is a high voltage, the second voltage input terminal V2 may receive a second voltage VGL that is a low voltage, and the third voltage input terminal V3 may receive the third voltage VGL2 that is a low voltage. The fourth voltage input terminal V4 may receive a fourth voltage VGLt that is a low voltage. The reset terminal RS may receive a reset signal SESR. The third voltage VGL2 may be greater or less than the second voltage VGL. The reset signal SESR may be at the first voltage VGH while the scan driver 130 is being driven. The reset signal SESR may be at the second voltage VGL for a certain period when the display device is started-up or when the display device is switched from a sleep mode to an active mode. The first voltage VGH, the second voltage VGL, the third voltage VGL2 and the fourth voltage VGLt are global signals, and may be supplied from the controller 190 shown in FIG. 1 and/or a power supplier (not shown).

The output terminal OUT may output the output signal Out, and the carry output terminal COUT may output the carry signal CR.

A signal output from the output terminal OUT may be a scan signal. The output signals Out[1], Out[2], Out[3], Out[4], . . . each having an on voltage period with four horizontal time periods (4H) may be shifted by one horizontal time period 1H and sequentially output from the output terminals OUT of the stages ST1, ST2, ST3, ST4, . . . . Each of the output signals Out[1], Out[2], Out[3], Out[4], . . . may be supplied to a pixel through a corresponding output line, for example, a scan line. The length of the on voltage period of each of the output signals Out[1], Out[2], Out[3], Out[4], . . . may be the same as the length of the on voltage period of the start signal.

A signal output from the carry output terminal COUT may be a carry signal. Each of carry signals CR[1], CR[2], CR[3], CR[4], . . . having an on voltage period with four horizontal time periods (4H) may be shifted by one horizontal time period 1H and sequentially output from the carry output terminals COUT of the stages ST1, ST2, ST3, ST4, . . . . The length of the on voltage period of each of the carry signals CR[1], CR[2], CR[3], CR[4], . . . may be the same as the length of the on voltage period of the start signal.

Figure 5:
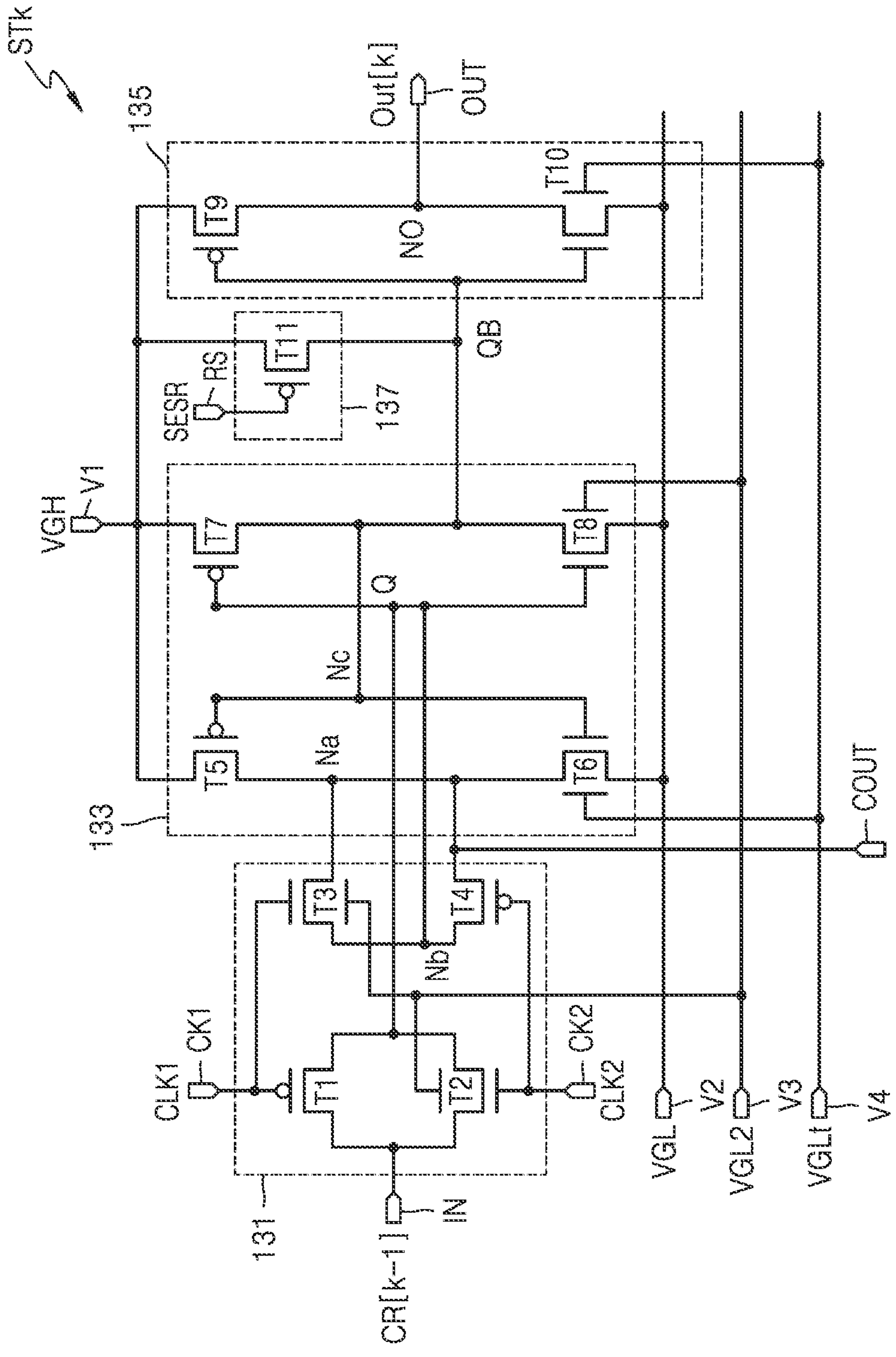
FIG. 5 is a circuit diagram illustrating an example of a stage included in the scan driver of FIG. 3.
Figure 6:
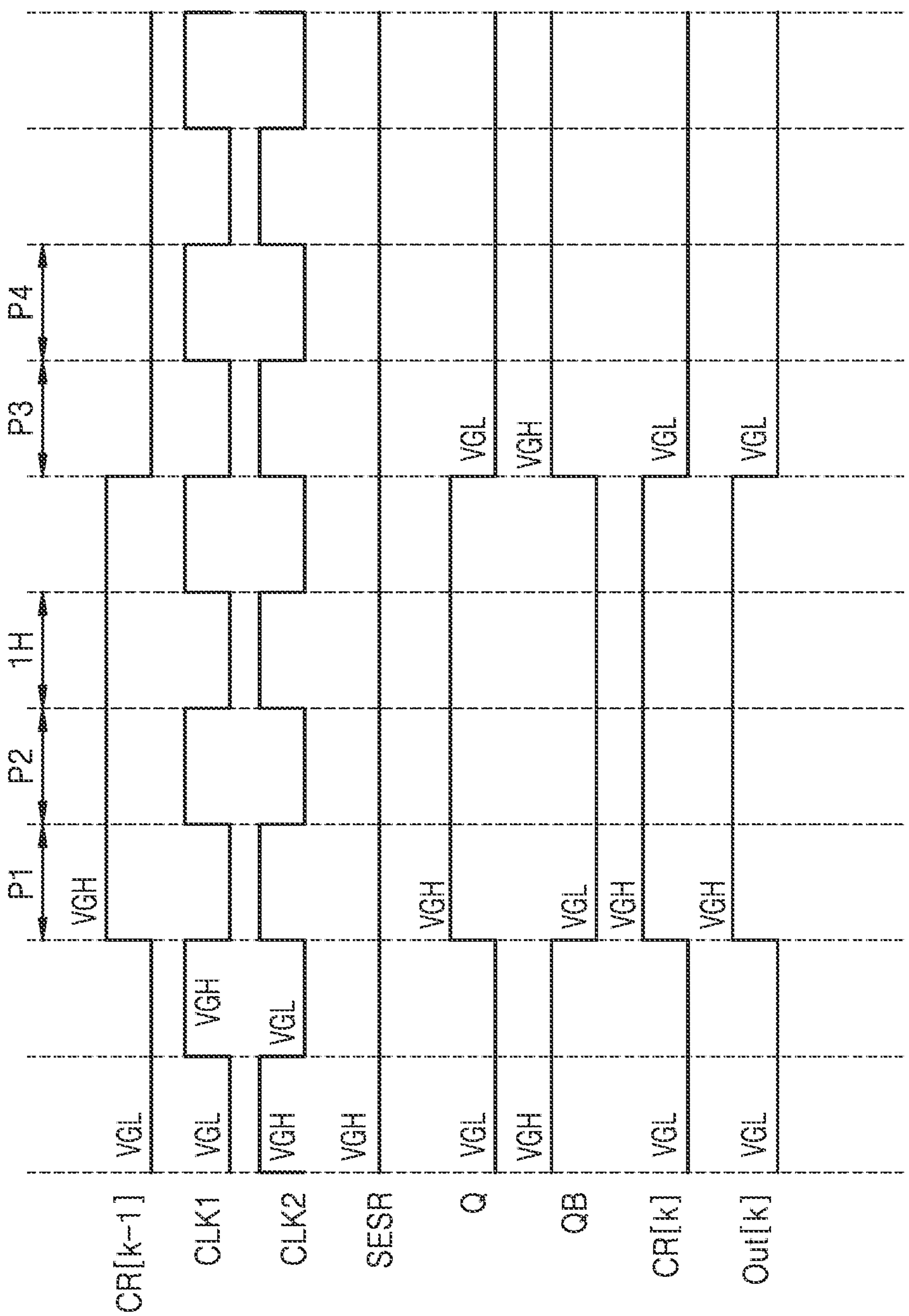
FIG. 6 is a waveform diagram illustrating driving of the stage of FIG. 3.
Figure 7:
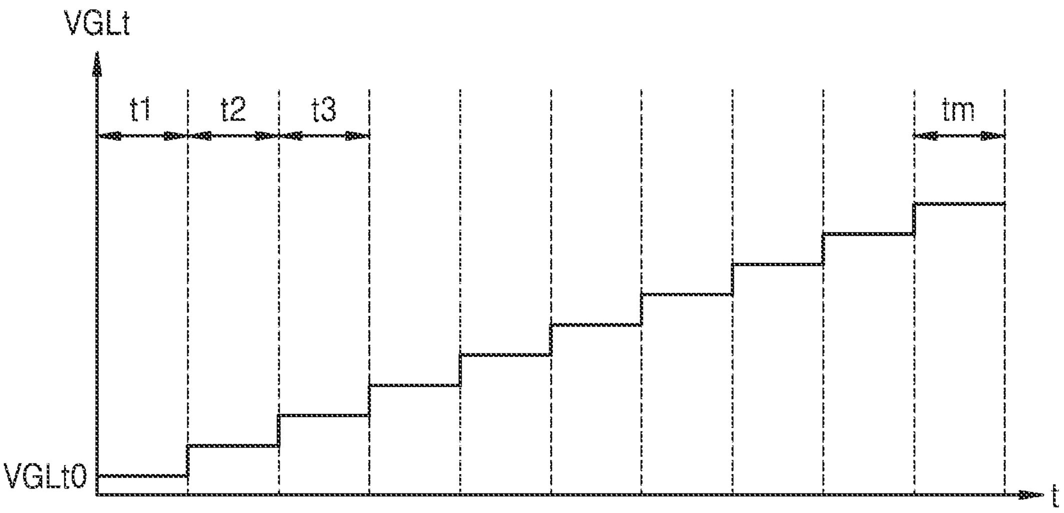
FIG. 7 is a waveform diagram of a fourth voltage.

FIG. 5 is a circuit diagram illustrating an example of a stage included in the scan driver 130 of FIG. 3. FIG. 6 is a waveform diagram illustrating the driving of the stage of FIG. 3. FIG. 7 is a waveform diagram of the fourth voltage VGLt.

Each of the stages ST1, ST2, ST3, ST4, . . . has a plurality of nodes. Hereinafter, some of the plurality of nodes will be referred to as a first control node Q and a second control node QB. Hereinafter, a k-th stage STk, which is as an odd-numbered stage, will be described as an example, and the k-th stage STk may output a k-th output signal Out[k] to a k-th row of the pixel portion 110. Hereinafter, for convenience of description, the k-th stage STk and the k-th output signal Out[k] will be referred to as a stage STk and an output signal Out[k], respectively. In addition, the first voltage VGH is expressed as a high voltage, and the second voltage VGL, the third voltage VGL2, and the fourth voltage VGLt are expressed as a low voltage. Here, the high voltage may be defined as an on voltage, and the low voltage may be defined as an off voltage.

The stage STk may include a first node controller 131, a second node controller 133, and an output controller 135. Each of the first node controller 131, the second node controller 133, and the output controller 135 may include at least one transistor. The at least one transistor may include an N-type transistor and/or a P-type transistor. The N-type transistor may be an N-type oxide semiconductor transistor. The P-type transistor may be a P-type silicon semiconductor transistor. The N-type oxide semiconductor transistor may be a dual gate transistor including a first gate that is a top gate disposed above a semiconductor and a second gate that is a bottom gate disposed below the semiconductor. For example, a first transistor T1, a fourth transistor T4, a fifth transistor T5, a seventh transistor T7, and a ninth transistor T9 of the stage STk may be P-type transistors, and a second transistor T2, a third transistor T3, a sixth transistor T6, an eighth transistor T8, and a tenth transistor T10 of the stage STk may be N-type transistors.

A previous carry signal CR[k−1] may be applied as a start signal to the input terminal IN, the first clock signal CLK1 may be applied to the first clock terminal CK1, and the second clock signal CLK2 may be applied to the second clock terminal CK2. The first voltage VGH may be applied to the first voltage input terminal V1, the second voltage VGL may be applied to the second voltage input terminal V2, the third voltage VGL2 may be applied to the third voltage input terminal V3, and the fourth voltage VGLt may be applied to the fourth voltage input terminal V4. When k is 1, that is, when the stage STk is the first stage ST1, the external signal STV may be applied as a start signal to the input terminal IN of the first stage ST1.

The first node controller 131 may be connected between the input terminal IN and the first control node Q. The first node controller 131 may control the voltage of the first control node Q based on the start signal (e.g., the previous carry signal CR[k−1]), the first clock signal CLK1, and the second clock signal CLK2. The first node controller 131 may include the first transistor T1, the second transistor T2, the third transistor T3, and the fourth transistor T4.

The first transistor T1 may be connected between the input terminal IN and the first control node Q. The gate of the first transistor T1 may be connected to the first clock terminal CK1. The second transistor T2 may be connected between the input terminal IN and the first control node Q. The gate of the second transistor T2 may include a first gate connected to the second clock terminal CK2 and a second gate connected to the third voltage input terminal V3. The first transistor T1 and the second transistor T2 may be configured to be turned on when the first clock signal CLK1 is at a low voltage, and the second clock signal CLK2 is at a high voltage and configured to transfer a high voltage or a low voltage of the start signal applied to the input terminal IN to the first control node Q to thereby control the voltage level of the first control node Q.

The third transistor T3 may be connected between a first node Na and a second node Nb. The gate of the third transistor T3 may include a first gate connected to the first clock terminal CK1 and a second gate connected to the third voltage input terminal V3. The fourth transistor T4 may be connected between the first node Na and the second node Nb. The gate of the fourth transistor T4 may be connected to the second clock terminal CK2. The carry output terminal COUT may be connected to the first node Na. The second node Nb may be connected to the first control node Q. The third transistor T3 and the fourth transistor T4 may be configured to be turned on when the first clock signal CLK1 is at a high voltage, and the second clock signal CLK2 is at a low voltage and configured to transfer the first voltage VGH of the first voltage input terminal V1 or the second voltage VGL of the second voltage input terminal V2 to the first control node Q to thereby control the voltage level of the first control node Q.

The second node controller 133 may be connected between the first voltage input terminal V1 and the second voltage input terminal V2. The second node controller 133 may control the voltage level of the second control node QB according to the voltage level of the first control node Q. The second node controller 133 may include the fifth transistor T5, the sixth transistor T6, the seventh transistor T7, and the eighth transistor T8.

The fifth transistor T5 may be connected between the first voltage input terminal V1 and the first node Na. The gate of the fifth transistor T5 may be connected to a third node Nc, and the third node Nc may be connected to the second control node QB. The sixth transistor T6 may be connected between the second voltage input terminal V2 and the first node Na. The gate of the sixth transistor T6 may include a first gate connected to the third node Nc and a second gate connected to the fourth voltage input terminal V4. The fifth transistor T5 may be configured to be turned on when the second control node QB is in a low level state and configured to transfer the first voltage VGH applied to the first voltage input terminal V1 to the first node Na. The sixth transistor T6 may be configured to be turned on when the second control node QB is in a high level state and to transfer the second voltage VGL applied to the second voltage input terminal V2 to the first node Na.

The seventh transistor T7 may be connected between the first voltage input terminal V1 and the second control node QB. The gate of the seventh transistor T7 may be connected to the first control node Q. The eighth transistor T8 may be connected between the second voltage input terminal V2 and the second control node QB. The gate of the eighth transistor T8 may include a first gate connected to the first control node Q and a second gate connected to the third voltage input terminal V3. The seventh transistor T7 may be configured to be turned on when the first control node Q is in a low level state and configured to transfer the first voltage VGH applied to the first voltage input terminal V1 to the second control node QB to thereby control the second control node QB to a high level state. The eighth transistor T8 may be configured to be turned on when the first control node Q is in a high level state and configured to transfer the second voltage VGL applied to the second voltage input terminal V2 to the second control node QB to thereby control the second control node QB to a low level state.

The output controller 135 may be connected between the first voltage input terminal V1 and the second voltage input terminal V2. The output controller 135 may output an output signal having an on voltage or an output signal having an off voltage according to the voltage level of the second control node QB. The output controller 135 may include the ninth transistor T9 and the tenth transistor T10.

The ninth transistor T9 may be connected between the first voltage input terminal V1 and an output node NO. The gate of the ninth transistor T9 may be connected to the second control node QB. The tenth transistor T10 may be connected between the second voltage input terminal V2 and the output node NO. The gate of the tenth transistor T10 may include a first gate connected to the second control node QB and a second gate connected to the fourth voltage input terminal V4. The ninth transistor T9 may be a pull-up transistor that transfers a high voltage to the output node NO, and the tenth transistor T10 may be a pull-down transistor that transfers a low voltage to the output node NO. The ninth transistor T9 may be configured to be turned on when the second control node QB is in a low level state and configured to transfer the first voltage VGH applied to the first voltage input terminal V1 to the output node NO. The tenth transistor T10 may be configured to be turned on when the second control node QB is in a high level state and configured to transfer the second voltage VGL applied to the second voltage input terminal V2 to the output node NO.

The stage STk may further include a reset portion 137. The reset portion 137 may reset the second control node QB based on the reset signal SESR supplied to the reset terminal RS. The reset portion 137 may include an eleventh transistor T11 (reset transistor). The eleventh transistor T11 may be connected between the first voltage input terminal V1 and the second control node QB. The gate of the eleventh transistor T11 may be connected to the reset terminal RS. The eleventh transistor T11 may be configured to be turned on when the reset signal SESR having a low voltage is applied to the reset terminal RS, and when the eleventh transistor T11 is turned on, the second control node QB may be in a high level state by the first voltage VGH, and thus, the output signal may be initialized to a low voltage. Because the reset signal SESR is supplied as the second voltage VGL while the scan driver 130 is operating, the eleventh transistor T11 may be turned off.

Referring to FIG. 6, the width of each of first to fourth periods P1, P2, P3, and P4 may be one horizontal time period 1H. In FIG. 6, the previous carry signal CR[k−1], the first clock signal CLK1, the second clock signal CLK2, the reset signal SESR, the node voltage of the first control node Q, the node voltage of the second control node QB, a carry signal CR[k], and the output signal Out[k] are shown.

In the first period P1, the previous carry signal CR[k−1] input from a previous stage may be at a high voltage, the first clock signal CLK1 input to the first clock terminal CK1 may be at a low voltage, and the second clock signal CLK2 input to the second clock terminal CK2 may be at a high voltage.

In synchronization with the start signal having a high voltage, which is applied to the input terminal IN, when the first clock signal CLK1 and the second clock signal CLK2 are respectively applied to the first transistor T1 and the second transistor T2, the first transistor T1 and the second transistor T2 may be turned on. The previous carry signal CR[k−1] may be transferred to the first control node Q by the turned-on first transistor T1 and the turned-on second transistor T2. Thus, the first control node Q may be in a high level state, and the eighth transistor T8 having a gate connected to the first control node Q may be turned on so that the second voltage VGL may be transferred to the second control node Oft and the second control node QB may be in a low level state. The ninth transistor T9 having a gate connected to the second control node QB may be turned on, and thus the first voltage VGH may be transferred to the output node NO. The output signal Out[k] having a high voltage may be output from the output terminal OUT connected to the output node NO.

The fifth transistor T5 having a gate connected to the second control node QB may be turned on and thus the first node Na may be in a high level state by the first voltage VGH, and the carry signal CR[k] having a high voltage may be output from the carry output terminal COUT connected to the first node Na. In addition, the second node Nb connected to the first control node Q may be in a high level state.

In the second period P2, the first clock signal CLK1 may have a high voltage and the second clock signal CLK2 may have a low voltage. The first transistor T1 and the second transistor T2 may be turned off, and the third transistor T3 and the fourth transistor T4 may be turned on. The first node Na and the second node Nb may be electrically connected to the first control node Q by the turned-on third transistor T3 and the turned-on fourth transistor T4, and the first control node Q may maintain a high level state. While the first control node Q maintains the high level state, the second control node QB may be maintained in a low level state by the eighth transistor T8.

While the previous carry signal CR[k−1] maintains a high voltage, the first clock signal CLK1 and the second clock signal CLK2 may be alternately applied as a low voltage and a high voltage, and as the first period P1 and the second period P2 described above are repeated, the output signal Out[k] having a high voltage may be output from the output terminal OUT and the carry signal CR[k] having a high voltage may be output from the carry output terminal COUT.

In the third period P3, the previous carry signal CR[k−1] input from the previous stage may transition to a low voltage, the first clock signal CLK1 may be at a low voltage, and the second clock signal CLK2 may be at a high voltage.

The first transistor T1 and the second transistor T2 may be turned on by the first clock signal CLK1 having a low voltage and the second clock signal CLK2 having a high voltage, respectively, and the low voltage of the previous carry signal CR[k−1] may be transferred to the first control node Q and thus the first control node Q may be in a low level state. The seventh transistor T7 having a gate connected to the first control node Q may be turned on and thus the first voltage VGH may be transferred to the second control node Oft and the second control node QB may be in a high level state. The tenth transistor T10 having a gate connected to the second control node QB may be turned on and thus the second voltage VGL may be transferred to the output node NO, and the output signal Out[k] having a low voltage may be output from the output terminal OUT.

The sixth transistor T6 having a gate connected to the second control node QB may be turned on and thus the first node Na may be in a low level state by the second voltage VGL, and the carry signal CR[k] having a low voltage may be output from the carry output terminal COUT connected to the first node Na. In addition, the second node Nb connected to the first control node Q may be in a low level state.

In the fourth period P4, the first clock signal CLK1 may have a high voltage, and the second clock signal CLK2 may have a low voltage. The first transistor T1 and the second transistor T2 may be turned off, and the third transistor T3 and the fourth transistor T4 may be turned on. The first node Na and the second node Nb may be electrically connected to the first control node Q by the turned-on third transistor T3 and the turned-on fourth transistor T4, and the first control node Q may maintain a low-level state. While the first control node Q maintains the low level state, the second control node QB may be maintained in a high level state by the seventh transistor T7.

While the previous carry signal CR[k−1] maintains a low voltage, the first clock signal CLK1 and the second clock signal CLK2 may be alternately applied as a low voltage and a high voltage, and as the third period P3 and the fourth period P4 are repeated, the output signal Out[k] having a low voltage may be output from the output terminal OUT and the carry signal CR[k] having a low voltage may be output from the carry output terminal COUT.

The even-numbered stage is different from the odd-numbered stage in that the second clock signal CLK2 is applied to the first clock terminal CK1, and the first clock signal CLK1 is applied to the second clock terminal CK2. Other circuit configurations and operations of the even-numbered stage are the same as those of the odd-numbered stage described with reference to FIG. 5. The odd-numbered stage of the scan driver 130 shown in FIG. 3 may output an output signal having a high voltage in synchronization with the low voltage timing of the first clock signal CLK1 applied to the first clock terminal CK1. The even-numbered stage of the scan driver 130 may output an output signal having a high voltage in synchronization with the low voltage timing of the second clock signal CLK2 applied to the first clock terminal CK1.

The threshold voltage of an N-type transistor may be shifted by repeatedly receiving an on-bias applied over time. A threshold voltage shift of the N-type transistor may be compensated for by applying a low voltage having a polarity different from that of the high voltage to a second gate of the N-type transistor to which an on voltage of a high voltage is repeatedly applied to a first gate thereof. For example, a second gate of each of the second transistor T2, the third transistor T3, the sixth transistor T6, the eighth transistor T8, and the tenth transistor T10, in each of which an on voltage of a high voltage is repeatedly applied to a first gate thereof, may be connected to a voltage source (the third voltage input terminal V3 or the fourth voltage input terminal V4) for applying a low voltage. FIG. 5 illustrates an example in which the second gate of each of the second transistor T2, the third transistor T3, and the eighth transistor T8 receives the third voltage VGL2, and the second gate of each of the sixth transistor T6 and the tenth transistor T10 receives the fourth voltage VGLt.

In an embodiment, a low voltage period of the output signal Out[k] may be longer than a high voltage period thereof. A period in which the output signal Out[k] outputs a low voltage may be a period in which the second control node QB is in a high level state. Accordingly, anon voltage of a high voltage may be applied to the first gates of the sixth transistor T6 and the tenth transistor T10, and the first gates of the sixth transistor T6 and the tenth transistor T10 are connected to the second control node Qft for a long time. In an embodiment, the fourth voltage VGLt, which is a low voltage, may be applied to the second gates of the sixth transistor T6 and the tenth transistor T10, and may increase in steps from an initial value. First, while the first gates of the sixth transistor T6 and the tenth transistor T10 receive a high voltage, a low voltage having a different polarity from the high voltage is applied to the second gates of the sixth transistor T6 and the tenth transistor T10. Then, a voltage applied to the second gates changes over time so that threshold voltage shifts of the sixth transistor T6 and the tenth transistor T10 may be reduced, and thus the stages may be stably driven. Accordingly, the reliability of the display device may be secured even when the display device is used for a long time.

In an embodiment, as shown in FIG. 7, the fourth voltage VGLt may be a voltage that varies in units of a certain time. The fourth voltage VGLt may be changed such that an initial specific voltage VGLt0 is initially applied and gradually increases according to an operation time. The initial specific voltage VGLt0 may be different from the second voltage VGL and/or the third voltage VGL2. For example, the initial specific voltage VGLt0 may be less than the second voltage VGL. Voltage varying times t1, t2, t3, . . . and, tm of the fourth voltage VGLt may be set differently.

In another embodiment, the fourth voltage VGLt may be set to a constant voltage without being variable. For example, the fourth voltage VGLt may be determined, in which the fourth voltage VGLt is the smallest threshold voltage shift of the sixth transistor T6 and the tenth transistor T10 within a reliability guarantee time predicted through calculation and/or experimentation of stress applied to the sixth transistor T6 and the tenth transistor T10 according to a certain voltage. In an embodiment, the constant voltage may be the same as the third voltage VGL2. In this case, the constant voltage and the third voltage VGL2 may be applied through one signal line. In another embodiment, the constant voltage may be a voltage different from the second voltage VGL and/or the third voltage VGL2. For example, the constant voltage may be less than the second voltage VGL.

The threshold voltage of the N-type transistor may have a positive value or a negative value depending on a transistor manufacturing process. After the transistor manufacturing process, an initial threshold voltage of the N-type transistor may have a positive value greater than a critical value or a negative value less than the critical value. In an embodiment, when the initial threshold voltage of the N-type transistor is a positive value greater than the critical value, the third voltage VGL2 may be set to a value greater than the second voltage VGL to thereby shift the threshold voltage of the N-type transistor to a negative value. When the initial threshold voltage of the N-type transistor is a negative value less than the critical value, the third voltage VGL2 may be set to a value less than the second voltage VGL to thereby shift the threshold voltage of the N-type transistor to a positive value. In an embodiment, when the initial threshold voltage is a negative value less than the critical value, the third voltage VGL2 may be changed from an initial specific voltage to decrease in steps according to an operation time, and the fourth voltage VGLt may be changed from an initial specific voltage to increase in steps according to the operation time.

In another embodiment, the stage STk may further include a capacitor disposed between the first control node Q and the first voltage input terminal V1. In this case, the stage STk may have a structure more robust to leakage and/or switch errors. In another embodiment, the third transistor T3 and the fourth transistor T4 of the stage STk may be omitted to reduce the area of the non-display area. In another embodiment, the eleventh transistor T11 of the reset portion 137 may be connected between the first voltage input terminal V1 and the first control node Q, and thus, the first control node Q may be in a high level state. Accordingly, the output signal may be initialized to a high voltage.

Figure 8:
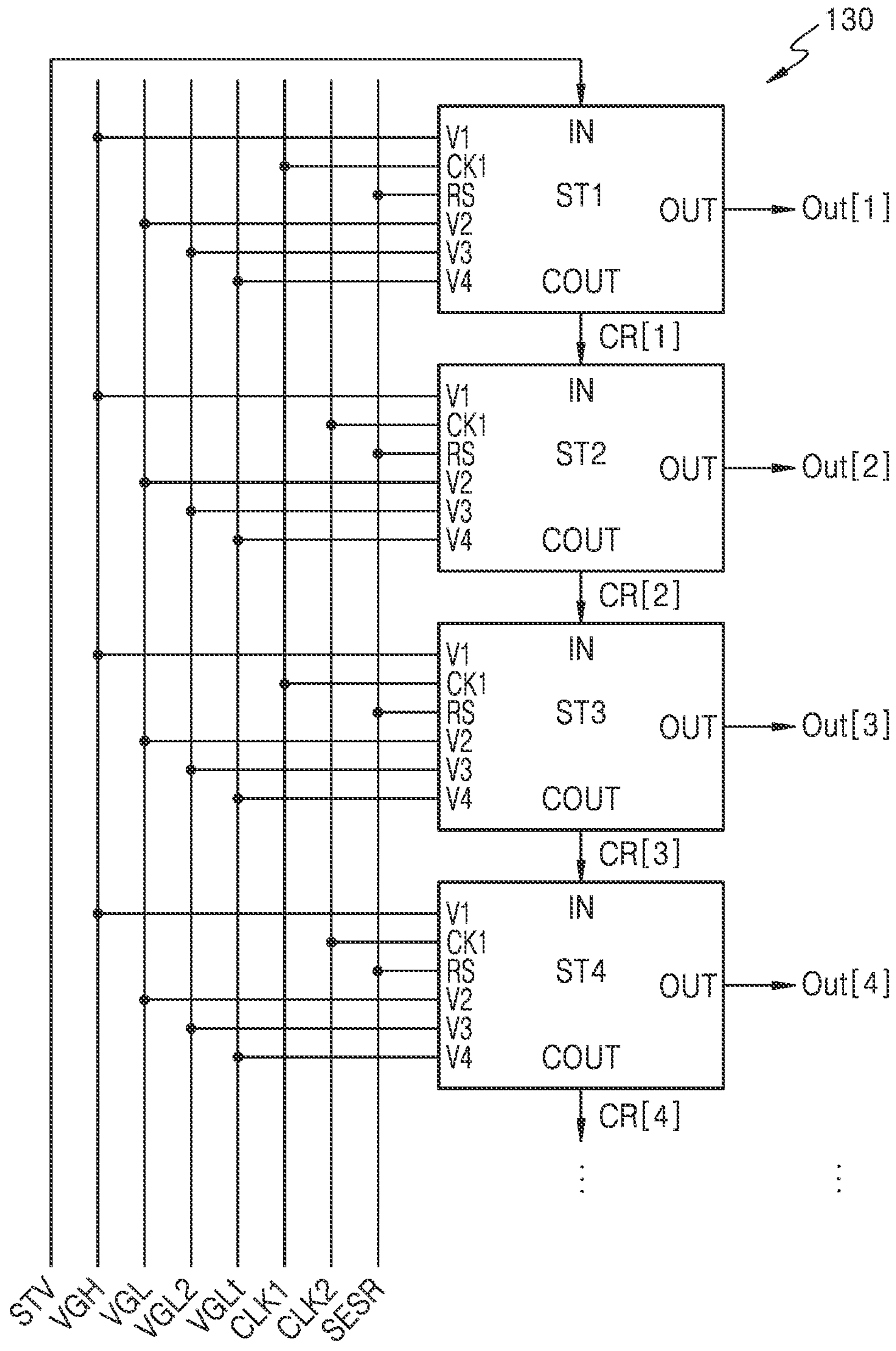
FIG. 8 is a schematic diagram illustrating a scan driver according to an embodiment.
Figure 9:
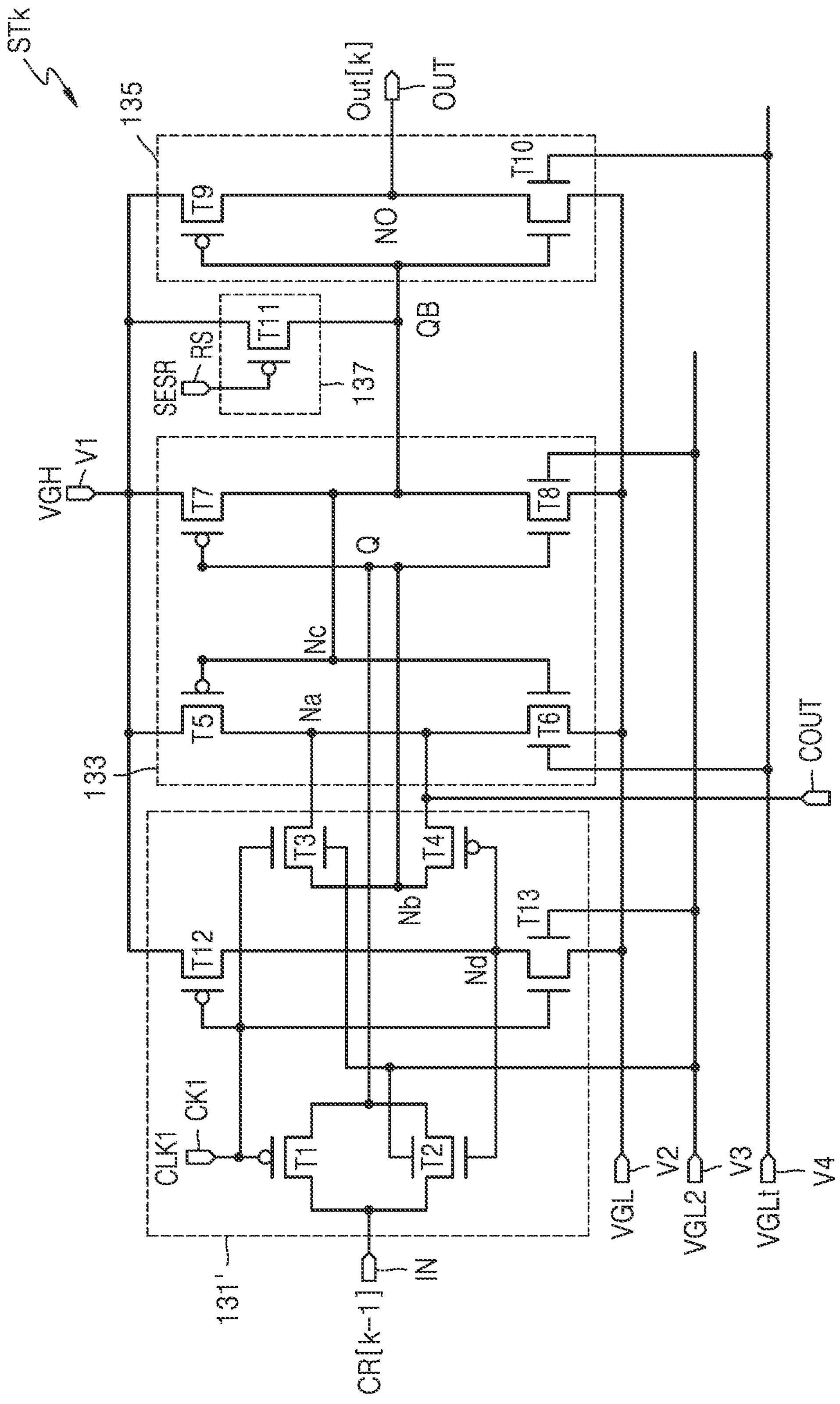
FIG. 9 is a circuit diagram illustrating an example of a stage included in the scan driver of FIG. 8.
Figure 10:
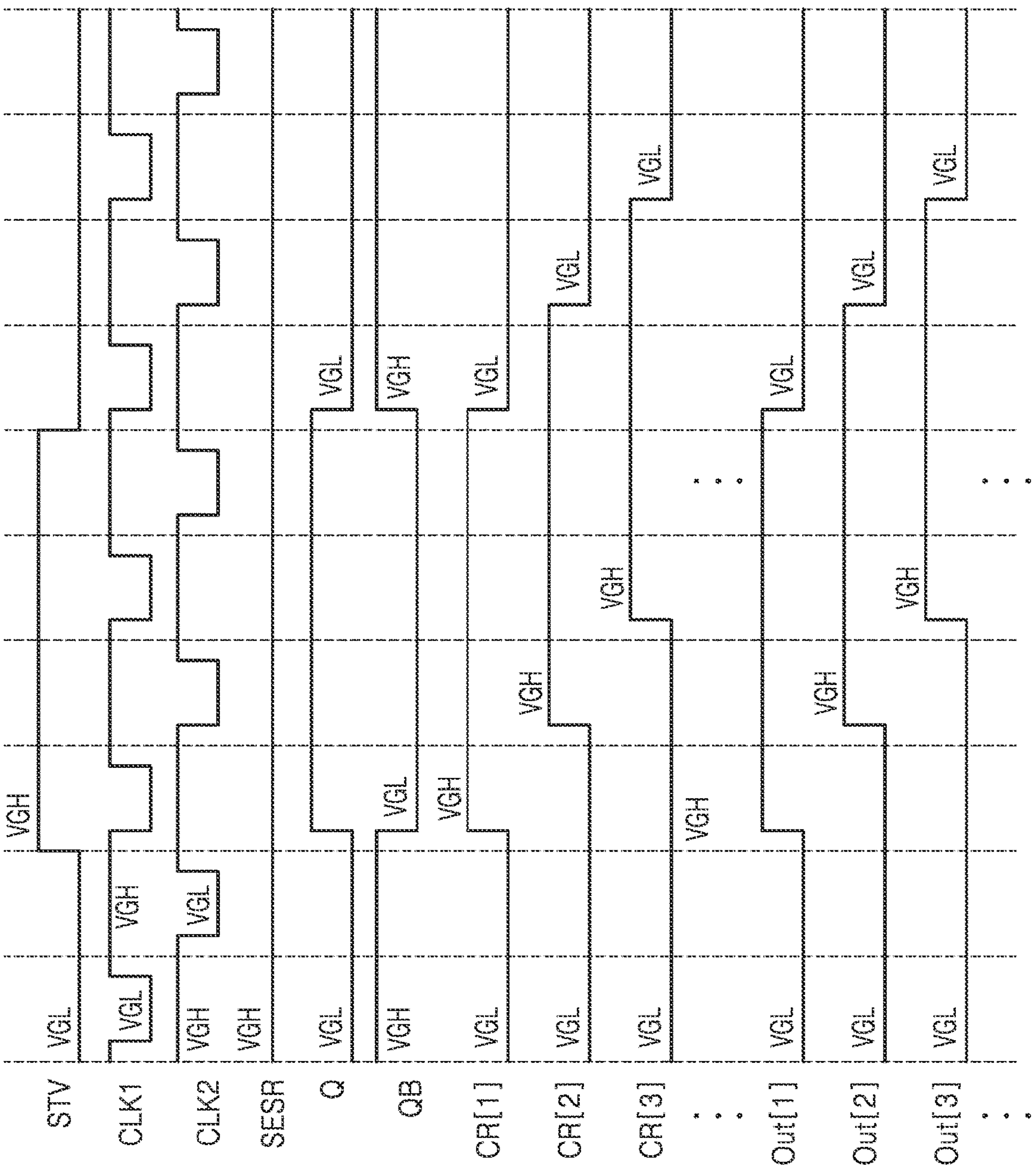
FIG. 10 is a diagram illustrating timings of input/output signals of the scan driver of FIG. 8 and node voltages of control nodes and input/output signals according to operation of the stage of FIG. 9.

FIG. 8 is a schematic diagram illustrating a scan driver 130 according to an embodiment. FIG. 9 is a circuit diagram illustrating an example of a stage included in the scan driver 130 of FIG. 8. FIG. 10 is a diagram illustrating timings of input/output signals of the scan driver 130 of FIG. 8 and voltages of control nodes and input/output signals according to the operation of the stage of FIG. 9.

The scan driver 130 shown in FIG. 8 is different from the scan driver 130 shown in FIG. 3 in that the second clock terminal CK2 is omitted. As shown in FIG. 8, a first clock signal CLK1 may be applied to a first clock terminal CK1 of an odd-numbered stage, and a second clock signal CLK2 may be applied to a first clock terminal CK1 of an even-numbered stage.

A first node controller 131' of a stage STk shown in FIG. 9 is different from the first node controller 131 of the stage STk shown in FIG. 5, and other configurations and operations of the stage STk shown in FIG. 9 are the same as those of the stage STk shown in FIG. 5. Hereinafter, the differences will be mainly described.

The first node controller 131' may include a first transistor T1, a second transistor T2, a third transistor T3, a fourth transistor T4, a twelfth transistor T12, and a thirteenth transistor T13.

The first transistor T1 may be connected between an input terminal IN and a first control node Q. The gate of the first transistor T1 may be connected to the first clock terminal CK1.

The second transistor T2 may be connected between the input terminal IN and the first control node Q. The gate of the second transistor T2 may include a first gate connected to a fourth node Nd and a second gate connected to a third voltage input terminal V3.

The third transistor T3 may be connected between a first node Na and a second node Nb. The gate of the third transistor T3 may include a first gate connected to the first clock terminal CK1 and a second gate connected to the third voltage input terminal V3.

The fourth transistor T4 may be connected between the first node Na and the second node Nb. The gate of the fourth transistor T4 may be connected to the fourth node Nd.

The twelfth transistor T12 may be connected between a first voltage input terminal V1 and the fourth node Nd. The gate of the twelfth transistor T12 may be connected to the first clock terminal CK1.

The thirteenth transistor T13 may be connected between a second voltage input terminal V2 and the fourth node Nd. The gate of the thirteenth transistor T13 may include a first gate connected to the first clock terminal CK1 and a second gate connected to the third voltage input terminal V3.

While a start signal (an external signal STV or a previous carry signal CR[k−1]) maintains a high voltage, the low voltage and the high voltage of the first clock signal CLK1 may be alternately applied.

When the first clock signal CLK1 has a low voltage, the first transistor T1 and the twelfth transistor T12 may be turned on. A first voltage VGH may be transferred to the fourth node Nd by the turned-on twelfth transistor T12, and thus, the fourth node Nd may be in a high level state, and the second transistor T2 having a first gate connected to the fourth node Nd may be turned on. The first control node Q may be in a high level state by the turned-on first transistor T1 and the turned-on second transistor T2. An eighth transistor T8 having a gate connected to the first control node Q may be turned on, and thus, a second control node QB may be in a low level state. A ninth transistor T9 having a gate connected to the second control node QB may be turned on to output an output signal Out[k] having a high voltage. A fifth transistor T5 having a gate connected to the second control node QB may be turned on so that the first node Na may be in a high level state by the first voltage VGH, and a carry signal CR[k] having a high voltage may be output from a carry output terminal COUT. In addition, the second node Nb connected to the first control node Q may be in a high level state.

When the first clock signal CLK1 has a high voltage, the third transistor T3 and the thirteenth transistor T13 may be turned on. The fourth node Nd may be in a low level state by the turned-on thirteenth transistor T13, and the fourth transistor T4 having a gate connected to the fourth node Nd may be turned on. The first control node Q may be maintained in a high level state by the turned-on third transistor T3 and the turned-on fourth transistor T4. While the first control node Q maintains the high level state, the second control node QB may be maintained in a low level state by the eighth transistor T8.

While the start signal (the external signal STV or the previous carry signal CR[k−1]) transitions to a low voltage and maintains the low voltage, the low voltage and the high voltage of the first clock signal CLK1 may be alternately applied.

When the first clock signal CLK1 has a low voltage, the first transistor T1, the twelfth transistor T12, and the second transistor T2 may be turned on. The first control node Q may be in a low level state by the turned-on first transistor T1 and the turned-on second transistor T2. A seventh transistor T7 having a gate connected to the first control node Q may be turned on, and thus, the second control node QB may be in a high level state. A tenth transistor T10 having a gate connected to the second control node QB may be turned on to thereby output the output signal Out[k] having a low voltage from the output terminal OUT. The fifth transistor T5 having the gate connected to the second control node QB may be turned on to thereby output the carry signal CR[k] having a high voltage from the carry output terminal COUT.

When the first clock signal CLK1 has a high voltage, the third transistor T3, the thirteenth transistor T13, and the fourth transistor T4 may be turned on. The first control node Q may be maintained in a low level state by the turned-on third transistor T3 and the turned-on fourth transistor T4. While the first control node Q maintains the low level state, the second control node QB may be maintained in a low level state by the seventh transistor T7.

The even-numbered stage is different from the odd-numbered stage in that the second clock signal CLK2 is applied to the first clock terminal CK1, and other circuit configurations and operations of the even-numbered stage are the same as those of the odd-numbered stage described with reference to FIG. 9. The odd-numbered stage of the scan driver 130 shown in FIG. 9 may output an output signal having a high voltage in synchronization with the low voltage timing of the first clock signal CLK1 applied to the first clock terminal CK1. The even-numbered stage of the scan driver 130 may output an output signal having a high voltage in synchronization with the low voltage timing of the second clock signal CLK2 applied to the first clock terminal CK1.

As shown in FIG. 10, the start timing and the end timing of the high voltage of the first clock signal CLK1 may not coincide with the start timing and the end timing of the low voltage of the second clock signal CLK2, respectively. As the timing at which the voltage levels of the first clock signal CLK1 and the second clock signal CLK2 are inverted is offset, the low voltage period of the first clock signal CLK1 may overlap a part of the high voltage period of the second clock signal CLK2, and the low voltage period of the second clock signal CLK2 may overlap a part of the high voltage period of the first clock signal CLK1. The low voltage periods of the first clock signal CLK1 and the second clock signal CLK2 may be shorter than the high voltage periods of the first clock signal CLK1 and the second clock signal CLK2.

When the first and second clock signals CLK1 and CLK2 shown in FIG. 10 are applied to the scan driver 130, each stage of the scan driver 130 may malfunction due to a skew between the first clock signal CLK1 and the second clock signal CLK2. In the embodiment, by controlling the turn-on of the first transistor T1 and the third transistor T3 by using clock signals and controlling the turn-on of the second transistor T2 and the fourth transistor T4 with the constant voltages of the first voltage VGH and the second voltage VGL, not clock signals, by using the twelfth transistor T12 and the thirteenth transistor T13, a malfunction of the scan driver 130 due to a skew between clock signals may be reduced. The present embodiment is not limited thereto, and as shown in FIG. 4, the first clock signal CLK1 and the second clock signal CLK2 that are simultaneously inverted may be used.

In the embodiment shown in FIG. 10, the low voltage of a clock signal is used as an enable voltage, and thus, an output signal having a high voltage is output in synchronization with the low voltage of the clock signal. However, the embodiment is not limited thereto. For example, the high voltage of the clock signal may be used as the enable voltage.

Figure 11:
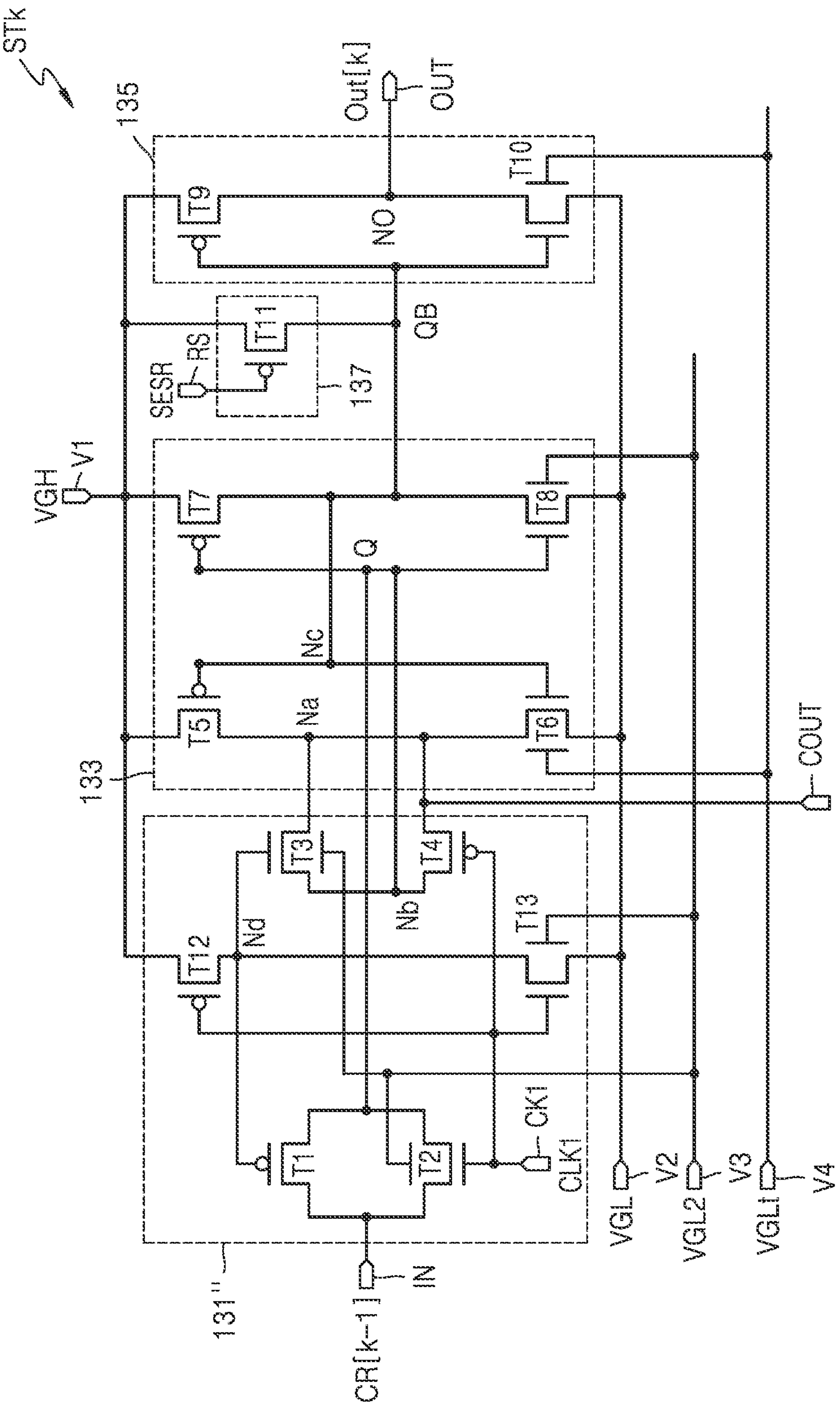
FIG. 11 is a circuit diagram illustrating an example of a stage included in the scan driver of FIG. 8.
Figure 12:
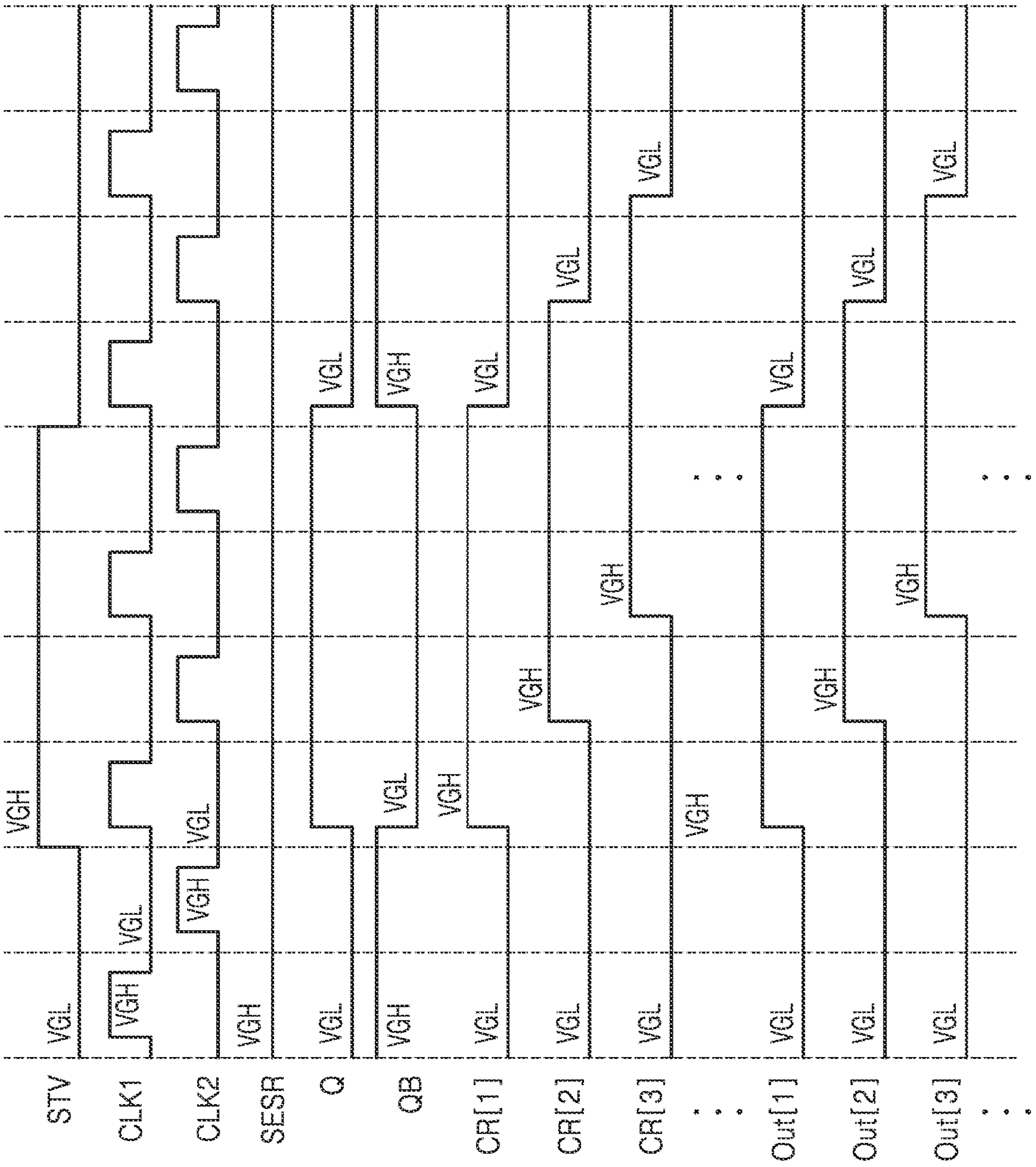
FIG. 12 is a diagram illustrating timings of input/output signals of the scan driver of FIG. 8 and node voltages of control nodes and input/output signals according to operation of the stage of FIG. 11.

FIG. 11 is a circuit diagram illustrating an example of a stage STk included in the scan driver 130 of FIG. 8. FIG. 12 is a diagram illustrating timings of input/output signals of the scan driver 130 of FIG. 8 and voltages of control nodes and input/output signals according to the operation of the stage STk of FIG. 11.

The stage STk shown in FIG. 11 is different from the stage STk shown in FIG. 9 in that the connection of transistors of a first node controller 131" is different from that of the first node controller 131' of the stage STk shown in FIG. 9, and other configurations of the stage STk shown in FIG. 11 are the same as those of the stage STk shown in FIG. 9. Hereinafter, configurations and operations of the stage STk shown in FIG. 11, which are different from the configurations and operations of the stage STk shown in FIG. 9, will be mainly described.

Referring to FIG. 11, the stage STk may include a first node controller 131", a second node controller 133, and an output controller 135. The stage STk may further include a reset portion 137.

The first node controller 131" may include a first transistor T1, a second transistor T2, a third transistor T3, a fourth transistor T4, a twelfth transistor T12, and a thirteenth transistor T13.

The first transistor T1 may be connected between an input terminal IN and a first control node Q. The gate of the first transistor T1 may be connected to a fourth node Nd.

The second transistor T2 may be connected between the input terminal IN and the first control node Q. The gate of the second transistor T2 may include a first gate connected to a first clock terminal CK1 and a second gate connected to a third voltage input terminal V3.

The third transistor T3 may be connected between a first node Na and a second node Nb. The gate of the third transistor T3 may include a first gate connected to the fourth node Nd and a second gate connected to the third voltage input terminal V3.

The fourth transistor T4 may be connected between the first node Na and the second node Nb. The gate of the fourth transistor T4 may be connected to the first clock terminal CK1.

The twelfth transistor T12 may be connected between a first voltage input terminal V1 and the fourth node Nd. The gate of the twelfth transistor T12 may be connected to the first clock terminal CK1.

The thirteenth transistor T13 may be connected between a second voltage input terminal V2 and the fourth node Nd. The gate of the thirteenth transistor T13 may include a first gate connected to the first clock terminal CK1 and a second gate connected to the third voltage input terminal V3.

Referring to FIG. 12, the timing at which the voltage levels of a first clock signal CLK1 and a second clock signal CLK2 are inverted may be offset, and the high voltage periods of the first and second clock signals CLK1 and CLK2 may be shorter than the low voltage periods of the first and second clock signals CLK1 and CLK2. The high voltage period of the first clock signal CLK1 may overlap a part of the low voltage period of the second clock signal CLK2, and the high voltage period of the second clock signal CLK2 may overlap a part of the low voltage period of the first clock signal CLK1.

While a start signal (an external signal STV or a previous carry signal CR[k−1]) maintains a high voltage, the high voltage and the low voltage of the first clock signal CLK1 may be alternately applied.

When the first clock signal CLK1 has a high voltage, the second transistor T2 and the thirteenth transistor T13 may be turned on. A second voltage VGL may be transferred to the fourth node Nd by the turned-on thirteenth transistor T13 so that the fourth node Nd may be in a low level state, and the first transistor T1 having a gate connected to the fourth node Nd may be turned on. The first control node Q may be in a high level state by the turned-on first transistor T1 and the turned-on second transistor T2. An eighth transistor T8 having a gate connected to the first control node Q may be turned on, and thus, the second control node QB may be in a low level state. A ninth transistor T9 having a gate connected to the second control node QB may be turned on to thereby output an output signal Out[k] having a high voltage. A fifth transistor T5 having a gate connected to the second control node QB may be turned on and thus the first node Na may be in a high level state by the first voltage VGH, and a carry signal CR[k] having a high voltage may be output from a carry output terminal COUT. In addition, the second node Nb connected to the first control node Q may be in a high level state.

When the first clock signal CLK1 has a low voltage, the fourth transistor T4 and the twelfth transistor T12 may be turned on. The fourth node Nd may be in a high level state by the turned-on twelfth transistor T12, and the third transistor T3 having a gate connected to the fourth node Nd may be turned on. The first control node Q may be maintained in a high level state by the turned-on third transistor T3 and the turned-on fourth transistor T4. While the first control node Q maintains the high level state, the second control node QB may be maintained in a low level state by the eighth transistor T8.

While the start signal (the external signal STV or the previous carry signal CR[k−1]) transitions to a low voltage and maintains the low voltage, the high voltage and the low voltage of the first clock signal CLK1 may be alternately applied.

When the first clock signal CLK1 has a high voltage, the first transistor T1, the thirteenth transistor T13, and the second transistor T2 may be turned on. The first control node Q may be in a low level state by the turned-on first transistor T1 and the turned-on second transistor T2. A seventh transistor T7 having a gate connected to the first control node Q may be turned on, and thus, the second control node QB may be in a high level state. A tenth transistor T10 having a gate connected to the second control node QB may be turned on to thereby output the output signal Out[k] having a low voltage from the output terminal OUT. A sixth transistor T6 having a gate connected to the second control node QB may be turned on to output the carry signal CR[k] of the low voltage from the carry output terminal COUT.

When the first clock signal CLK1 has a low voltage, the third transistor T3, the twelfth transistor T12, and the fourth transistor T4 may be turned on. The first control node Q may be maintained in a low level state by the turned-on third transistor T3 and the turned-on fourth transistor T4. While the first control node Q maintains the low level state, the second control node QB may be maintained in a high level state by the seventh transistor T7.

The even-numbered stage is different from the odd-numbered stage in that the second clock signal CLK2 is applied to the first clock terminal CK1, and other circuit configurations and operations of the even-numbered stage are the same as those of the odd-numbered stage described with reference to FIG. 11.

The odd-numbered stage of the scan driver 130 shown in FIG. 11 may output an output signal having a high voltage in synchronization with the high voltage application timing of the first clock signal CLK1 applied to the first clock terminal CK1. The even-numbered stage of the scan driver 130 may output an output signal having a high voltage in synchronization with the high voltage application timing of the second clock signal CLK2 applied to the first clock terminal CK1. As shown in FIG. 12, the high voltage of a clock signal is used as an enable voltage, and thus, an output signal having a high voltage may be output in synchronization with the high voltage of the clock signal.

Figure 13:
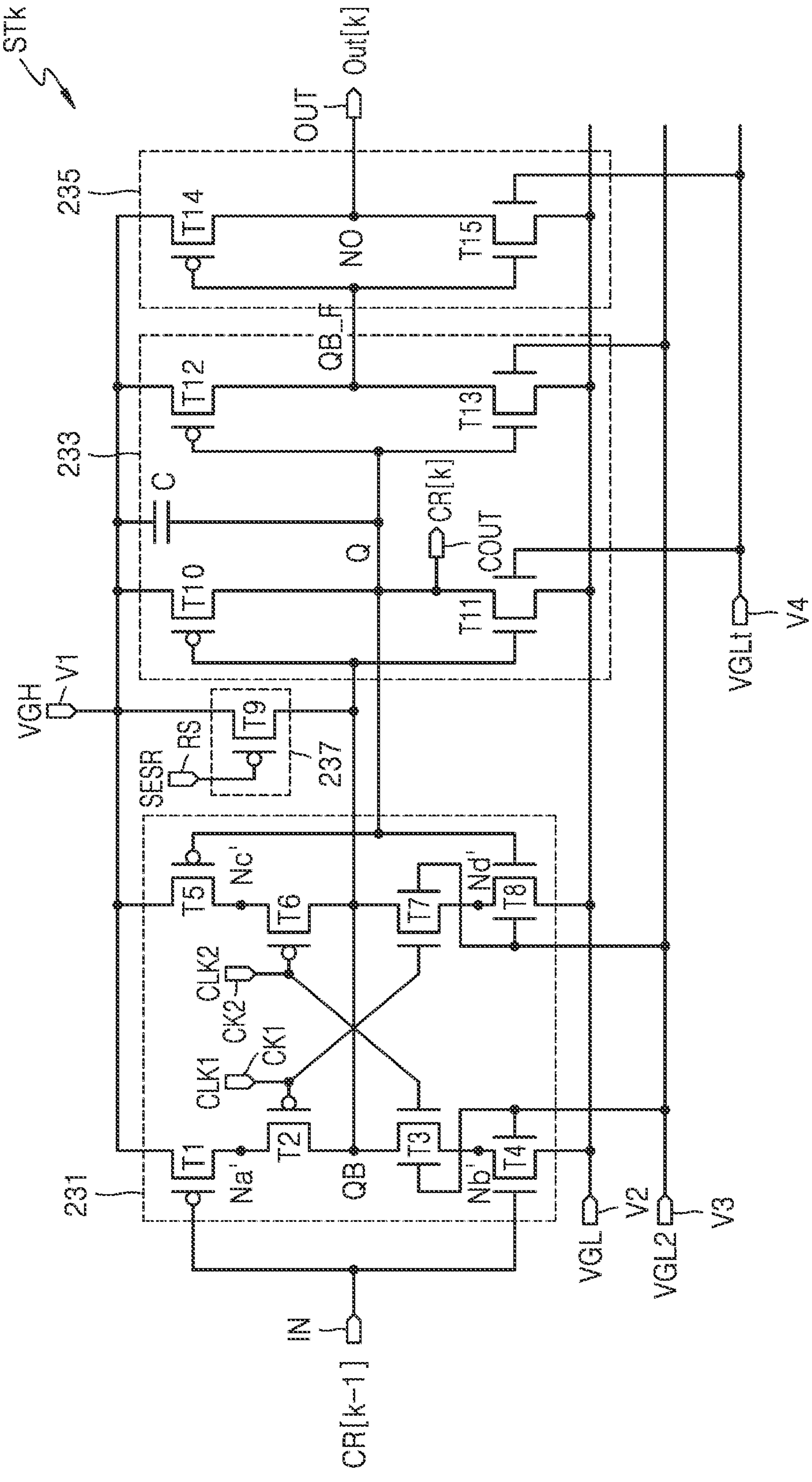
FIG. 13 is a circuit diagram illustrating an example of a stage included in the scan driver of FIG. 3.
Figure 14:
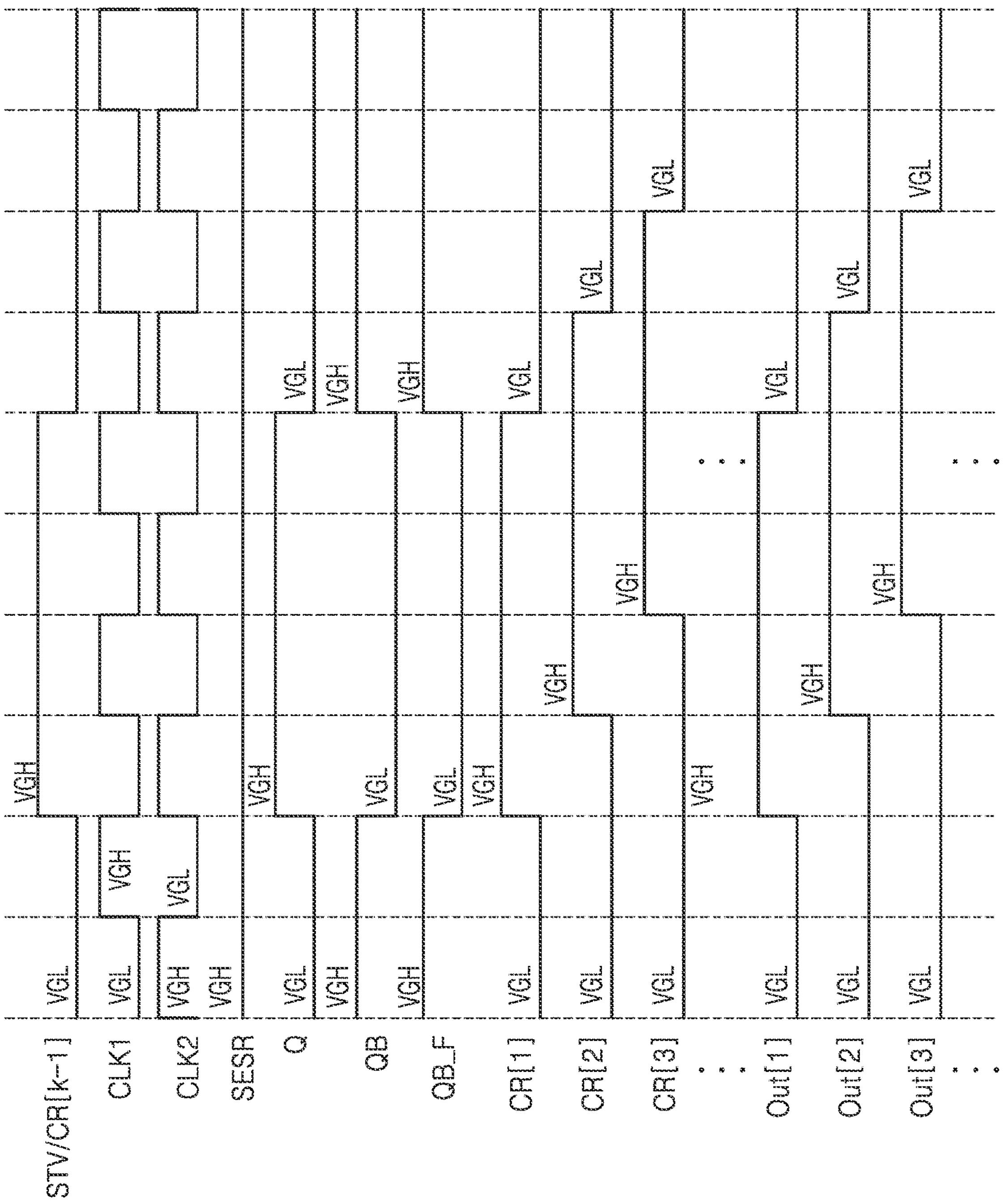
FIG. 14 is a diagram illustrating timings of node voltages of control nodes and input/output signals according to operation of the stage of FIG. 13.

FIG. 13 is a circuit diagram illustrating an example of a stage STk included in the scan driver 130 of FIG. 3. FIG. 14 is a diagram illustrating timings of voltages of control nodes and input/output signals according to the operation of the stage STk of FIG. 13.

Referring to FIG. 13, the stage STk may include a first node controller 231, a second node controller 233, and an output controller 235. The stage STk may further include a reset portion 237. Some nodes of the stage STk are referred to as a first control node Q, a second control node Oft and a third control node QB_F.

The first node controller 231 may be connected between a first voltage input terminal V1 and a second voltage input terminal V2, and may control the voltage of the first control node Q and the voltage of the second control node QB based on a start signal (e.g., an external signal STV or a previous scan signal) applied to an input terminal IN, a first clock signal CLK1 applied to a first clock terminal CK1, and a second clock signal CLK2 applied to a second clock terminal CK2. The first node controller 231 may include first to eighth transistors T1, T2, T3, T4, T5, T6, T7, and T8. The first transistor T1, the second transistor T2, the fifth transistor T5, and the sixth transistor T6 may be P-type transistors, and the third transistor T3, the fourth transistor T4, the seventh transistor T7, and the eighth transistor T8 may be N-type transistors.

The first transistor T1 may be connected between the first voltage input terminal V1 and a first node Na'. The gate of the first transistor T1 may be connected to the input terminal IN.

The second transistor T2 may be connected between the first node Na' and the second control node QB. The gate of the second transistor T2 may be connected to the first clock terminal CK1.

The first transistor T1 and the second transistor T2 may be connected in series and may be connected between the first voltage input terminal V1 and the second control node QB.

The third transistor T3 may be connected between the second control node QB and a second node Nb'. A first gate of the third transistor T3 may be connected to the second clock terminal CK2, and a second gate of the third transistor T3 may be connected to a third voltage input terminal V3.

The fourth transistor T4 may be connected between the second node Nb' and the second voltage input terminal V2. A first gate of the fourth transistor T4 may be connected to the input terminal IN, and a second gate of the fourth transistor T4 may be connected to the third voltage input terminal V3.

The third transistor T3 and the fourth transistor T4 may be connected in series and may be connected between the second voltage input terminal V2 and the second control node QB.

The fifth transistor T5 may be connected between the first voltage input terminal V1 and a third node Nc'. The gate of the fifth transistor T5 may be connected to the first control node Q.

The sixth transistor T6 may be connected between the third node Nc' and the second control node QB. The gate of the sixth transistor T6 may be connected to the second clock terminal CK2.

The fifth transistor T5 and the sixth transistor T6 may be connected in series and may be connected between the first voltage input terminal V1 and the second control node QB.

The seventh transistor T7 may be connected between the second control node QB and a fourth node Nd'. A first gate of the seventh transistor T7 may be connected to the first clock terminal CK1, and a second gate of the seventh transistor T7 may be connected to the third voltage input terminal V3.

The eighth transistor T8 may be connected between the fourth node Nd' and the second voltage input terminal V2. A first gate of the eighth transistor T8 may be connected to the first control node Q, and a second gate of the eighth transistor T8 may be connected to the third voltage input terminal V3.

The seventh transistor T7 and the eighth transistor T8 may be connected in series and may be connected between the second voltage input terminal V2 and the second control node QB.

The second node controller 233 may be connected between the first voltage input terminal V1 and the second voltage input terminal V2, and may control the voltage of the third control node QB_F according to the voltage of the first control node Q and the voltage of the second control node QB. The second node controller 233 may include tenth to thirteenth transistors T10, T11, T12, and T13 and a capacitor C. The tenth transistor T10 and the twelfth transistor T12 may be P-type transistors, and the eleventh transistor T11 and the thirteenth transistor T13 may be N-type transistors.

The tenth transistor T10 may be connected between the first voltage input terminal V1 and the first control node Q. The gate of the tenth transistor T10 may be connected to the second control node QB.

The eleventh transistor T11 may be connected between the first control node Q and the second voltage input terminal V2. A first gate of the eleventh transistor T11 may be connected to the second control node Oft and a second gate of the eleventh transistor T11 may be connected to a fourth voltage input terminal V4.

The twelfth transistor T12 may be connected between the first voltage input terminal V1 and the third control node QB_F. The gate of the twelfth transistor T12 may be connected to the first control node Q.

The thirteenth transistor T13 may be connected between the third control node QB_F and the second voltage input terminal V2. A first gate of the thirteenth transistor T13 may be connected to the first control node Q, and a second gate of the thirteenth transistor T13 may be connected to the third voltage input terminal V3.

The capacitor C may be connected between the first voltage input terminal V1 and the first control node Q.

The output controller 235 may be connected between the first voltage input terminal V1 and the second voltage input terminal V2, and may output an output signal having an on voltage or an output signal having an off voltage according to the voltage of the third control node QB_F. The output controller 235 may include a fourteenth transistor T14 and a fifteenth transistor T15. The fourteenth transistor T14 may be a P-type transistor, and the fifteenth transistor T15 may be an N-type transistor.

The fourteenth transistor T14 may be connected between the first voltage input terminal V1 and an output terminal OUT. The gate of the fourteenth transistor T14 may be connected to the third control node QB_F.

The fifteenth transistor T15 may be connected between the output terminal OUT and the second voltage input terminal V2. A first gate of the fifteenth transistor T15 may be connected to the third control node QB_F, and a second gate of the fifteenth transistor T15 may be connected to the fourth voltage input terminal V4.

The fourteenth transistor T14 may be a pull-up transistor transferring a high voltage to an output node NO, and the fifteenth transistor T15 may be a pull-down transistor transferring a low voltage to the output node NO.

The reset portion 237 may include a ninth transistor T9. The ninth transistor T9 may be a P-type transistor. The ninth transistor T9 may be connected between the first voltage input terminal V1 and the second control node QB. The gate of the ninth transistor T9 may be connected to a reset terminal RS. The ninth transistor T9 may be turned on by a reset signal SESR having a low voltage, and thus, the second control node QB may be in a high level state. Accordingly, the output signal may be initialized to a low voltage.

Referring to FIG. 14, while the start signal having a high voltage is applied to the input terminal IN and the fourth transistor T4 is turned on, the high voltage and the low voltage of the first clock signal CLK1 may be alternately applied to the first clock terminal CK1 a certain number of times, and the high voltage and the low voltage of the second clock signal CLK2 may be alternately applied to the second clock terminal CK2 a certain number of times.

The second transistor T2 and the third transistor T3 may be turned on by the first clock signal CLK1 having a low voltage and the second clock signal CLK2 having a high voltage, respectively, and the second control node QB may be in a low level state by a second voltage VGL applied to the second voltage input terminal V2. The tenth transistor T10 having a gate connected to the second control node QB having a low voltage may be turned on, and thus, the first control node Q may be in a high level state by a first voltage VGH applied to the first voltage input terminal V1. A carry signal CR[k] having a high voltage may be output from a carry output terminal COUT connected to the first control node Q. Then, the thirteenth transistor T13 having a gate connected to the first control node Q may be turned on, and thus, the third control node QB_F may be in a low level state by the second voltage VGL applied to the second voltage input terminal V2. The fourteenth transistor T14 having a gate connected to the third control node QB_F may be turned on and thus the first voltage VGH applied to the first voltage input terminal V1 may be transferred to the output node NO, and the output signal Out[k] having a high voltage may be output from the output terminal OUT connected to the output node NO.

When the first clock signal CLK1 transitions to a high voltage and the second clock signal CLK2 transitions to a low voltage, the seventh transistor T7 and the sixth transistor T6 may be turned on, and the eighth transistor T8 having a gate connected to the first control node Q may be in a high level state and may be turned on so that the second control node QB may be maintained in a low level state by the second voltage VGL applied to the second voltage input terminal V2.

While the start signal maintains a high voltage, the first clock signal CLK1 and the second clock signal CLK2 may be alternately applied as a low voltage and a high voltage, and as the operation described above is repeated, the output signal Out[k] having a high voltage may be output from the output terminal OUT and the carry signal CR[k] having a high voltage may be output from the carry output terminal COUT.

When the start signal transitions to a low voltage, the fourth transistor T4 may be turned off and the first transistor T1 may be turned on. In this case, the second transistor T2 and the third transistor T3 may be turned on by the first clock signal CLK1 having a low voltage and the second clock signal CLK2 having a high voltage, respectively, and the second control node QB may be in a high level state by the first voltage VGH applied to the first voltage input terminal V1. The eleventh transistor T11 having a gate connected to the second control node QB may be turned on, and thus, the first control node Q may be in a low level state by the second voltage VGL applied to the second voltage input terminal V2. The twelfth transistor T12 having a gate connected to the first control node Q may be turned on, and thus, the third control node QB_F may be in a high level state by the first voltage VGH applied to the first voltage input terminal V1. The fifteenth transistor T15 having a gate connected to the third control node QB_F may be turned on, and thus, the output signal Out[k] having a low voltage may be output from the output terminal OUT by the second voltage VGL applied to the second voltage input terminal V2.

When the first clock signal CLK1 transitions to a high voltage and the second clock signal CLK2 transitions to a low voltage, the seventh transistor T7 and the sixth transistor T6 may be turned on, and the twelfth transistor T12 having a gate connected to the first control node Q being in a low level state may be turned on and thus the third control node QB_F may be maintained in a high level state by the first voltage VGH applied to the first voltage input terminal V1.

While the start signal maintains a low voltage, the first clock signal CLK1 and the second clock signal CLK2 may be alternately applied as a low voltage and a high voltage, and as the operation described above is repeated, the output signal Out[k] having a low voltage may be output from the output terminal OUT and the carry signal CR[k] having a low voltage may be output from the carry output terminal COUT.

The even-numbered stage is different from the odd-numbered stage in that the second clock signal CLK2 is applied to the first clock terminal CK1 and the first clock signal CLK1 is applied to the second clock terminal CK2, and other circuit configurations and operations of the even-numbered stage are the same as those of the odd-numbered stage described with reference to FIG. 13.

In the embodiment shown in FIG. 13, a second gate of each of the third transistor T3, the fourth transistor T4, the seventh transistor T7, the eighth transistor T8, the eleventh transistor T11, the thirteenth transistor T13, and the fifteenth transistor T15, in each of which an on voltage of a high voltage is repeatedly applied to a first gate thereof, may be connected to a voltage source (the third voltage input terminal V3 or the fourth voltage input terminal V4) for applying a low voltage.

In an embodiment, a low voltage period of the output signal Out[k] may be longer than a high voltage period thereof. A period in which the output signal Out[k] outputs a low voltage may be a period in which each of the second control node QB and the third control node QB_F is in a high level state. Accordingly, an on voltage of a high voltage may be applied, for a long time, to the first gate of the eleventh transistor T11, the first gate of the eleventh transistor T11 being connected to the second control node QB and the first gate of the fifteenth transistor T15 and the first gate of the fifteenth transistor T15 being connected to the third control node QB_F. In an embodiment, a fourth voltage VGLt, which is a low voltage, may be applied to the second gates of the eleventh transistor T11 and the fifteenth transistor T15, and as shown in FIG. 7, the fourth voltage VGLt may increase in steps from an initial voltage VGLt0. First, while the first gates of the eleventh transistor T11 and the fifteenth transistor T15 receive a high voltage, a low voltage having a different polarity from the high voltage is applied to the second gates of the eleventh transistor T11 and the fifteenth transistor T15. Then, as a voltage applied to the second gates changes over time, threshold voltage shifts of the eleventh transistor T11 and the fifteenth transistor T15 may be reduced, and thus the stages may be stably driven. Accordingly, the reliability of the display device may be secured even when the display device is used for a long time.

Figure 15:
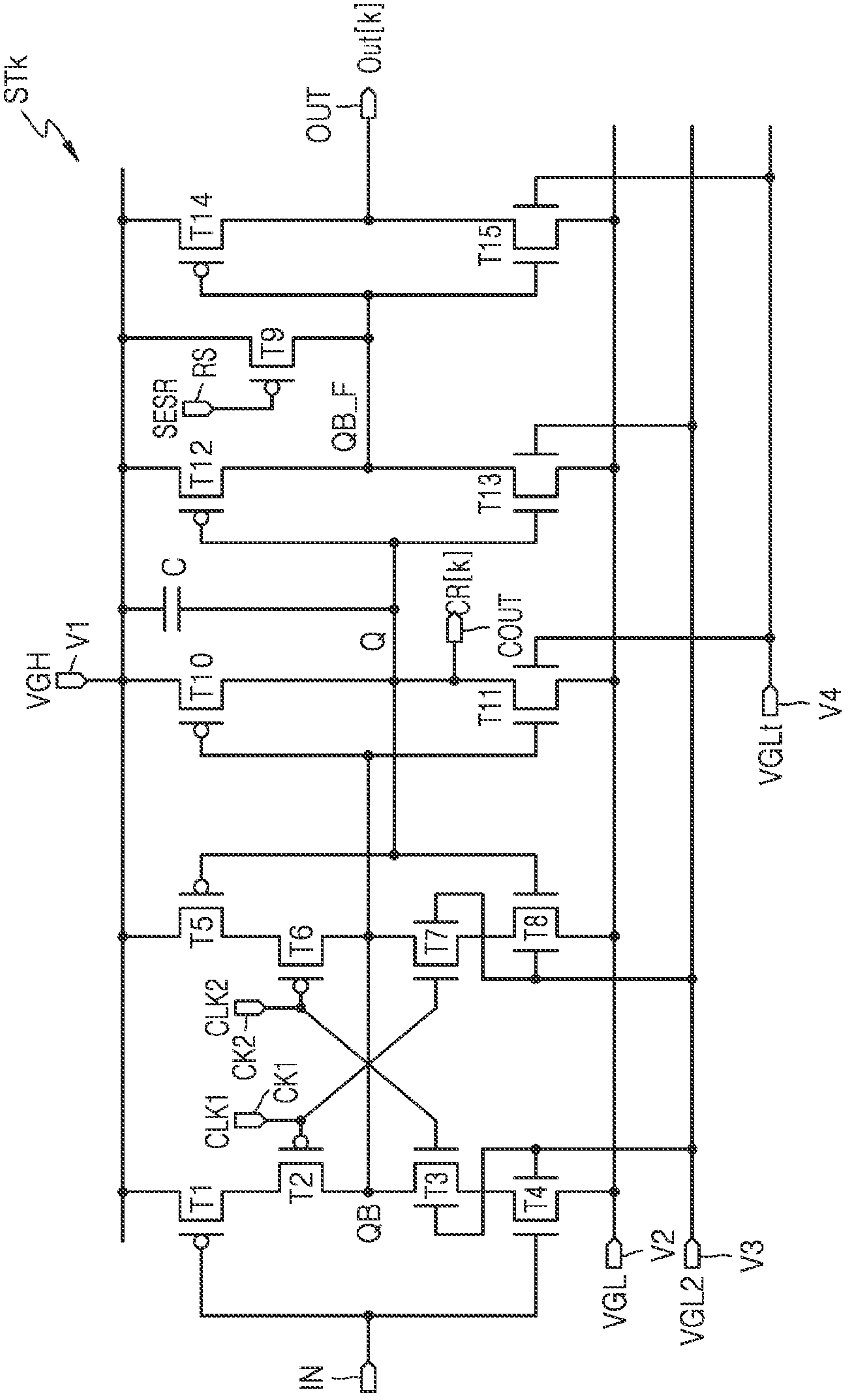
FIG. 15 is a circuit diagram illustrating an example of a stage included in the scan driver of FIG. 3.

FIG. 15 is a circuit diagram illustrating an example of a stage included in the scan driver 130 of FIG. 3. A stage STk shown in FIG. 15 is different from the stage STk shown in FIG. 13 in that the ninth transistor T9 is connected between the first voltage input terminal V1 and the third control node QB_F, and other configurations and operations of the stage STk shown in FIG. 15 are the same as those of the stage STk shown in FIG. 13.

Figure 16:
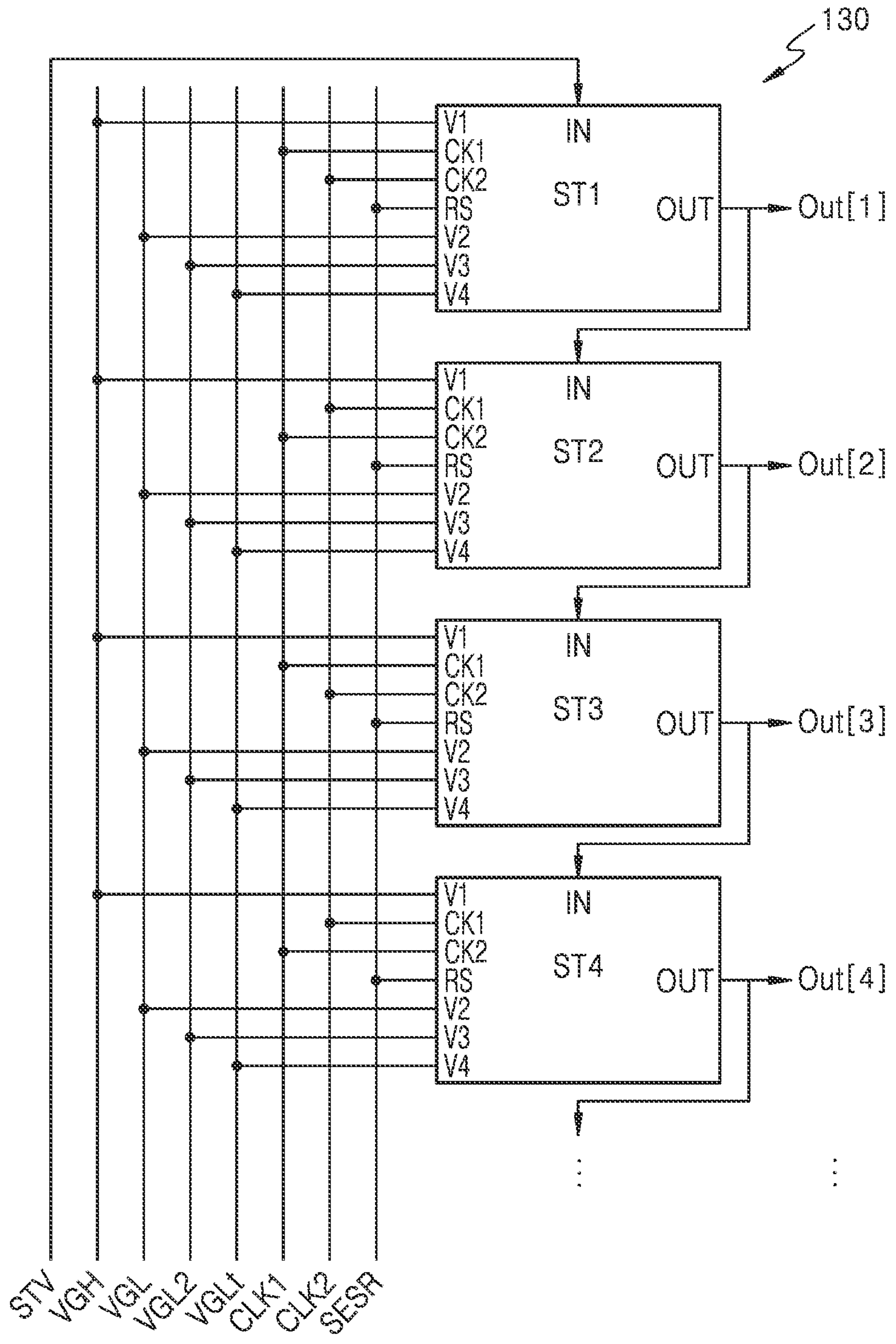
FIG. 16 is a schematic diagram illustrating a scan driver according to an embodiment.
Figure 17:
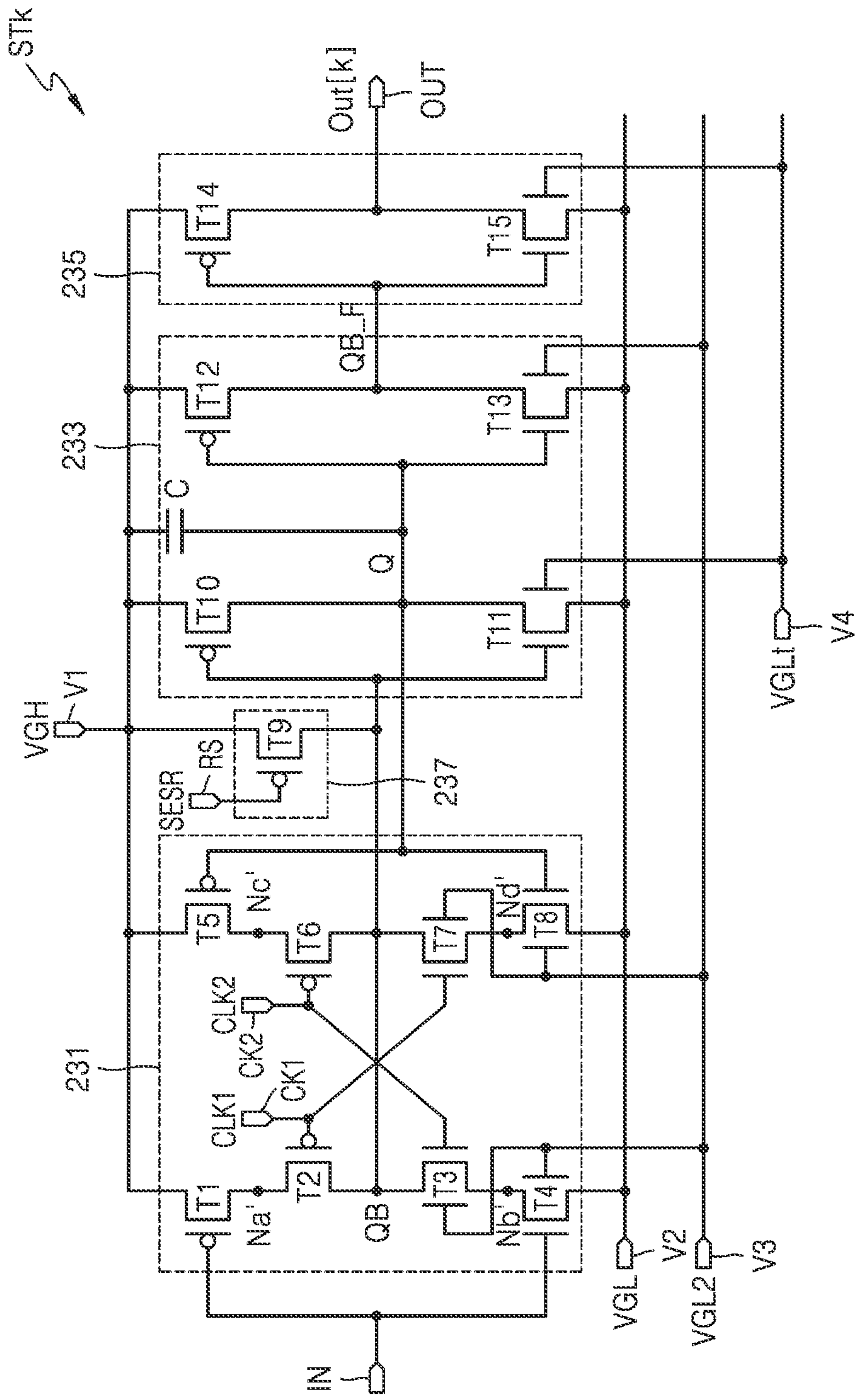
FIGS. 17 and 19 are circuit diagrams illustrating examples of a stage included in the scan driver of FIG. 16.
Figure 18:
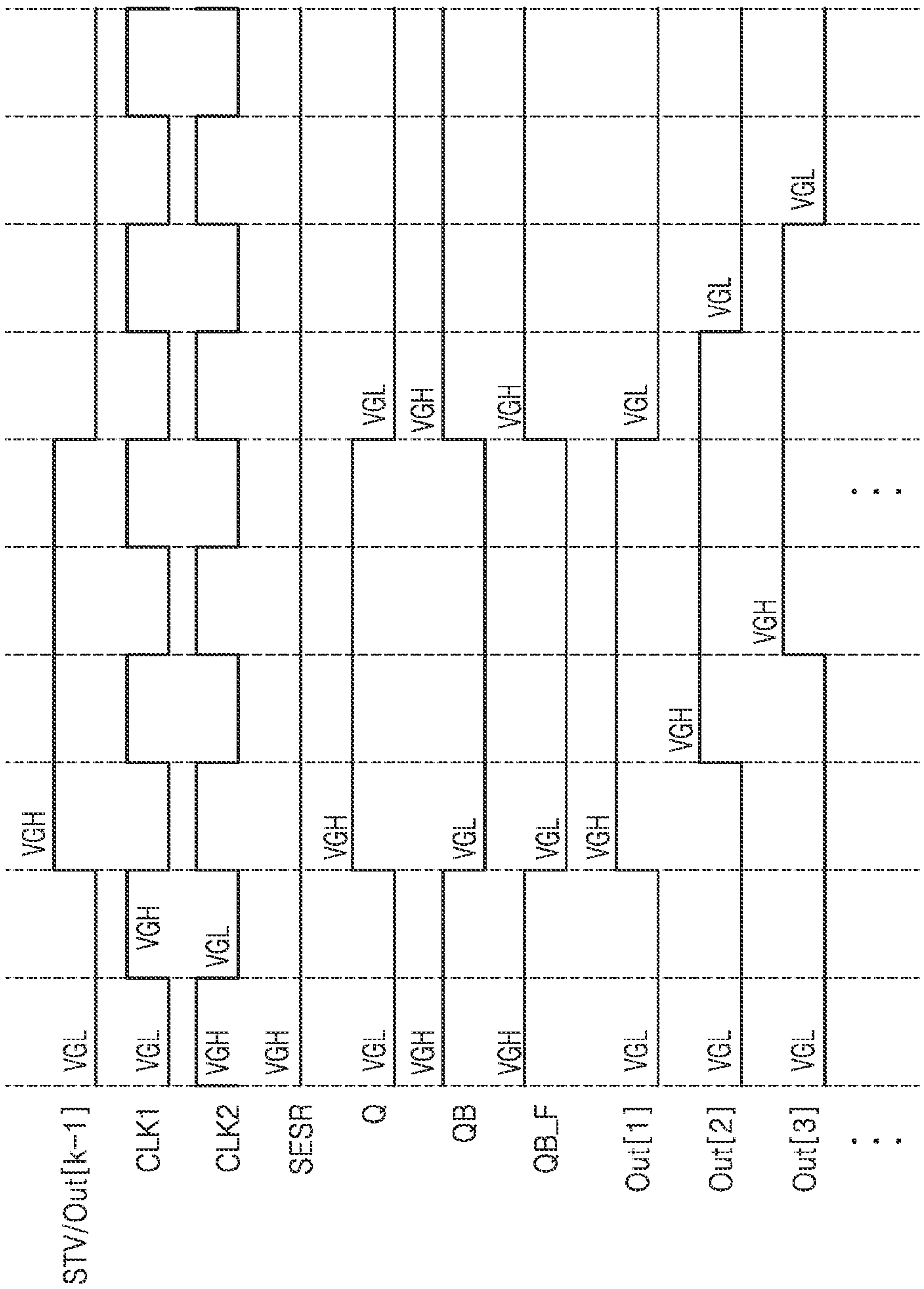
FIG. 18 is a diagram illustrating timings of node voltages of control nodes and input/output signals according to operation of the stage of FIG. 16.
Figure 19:
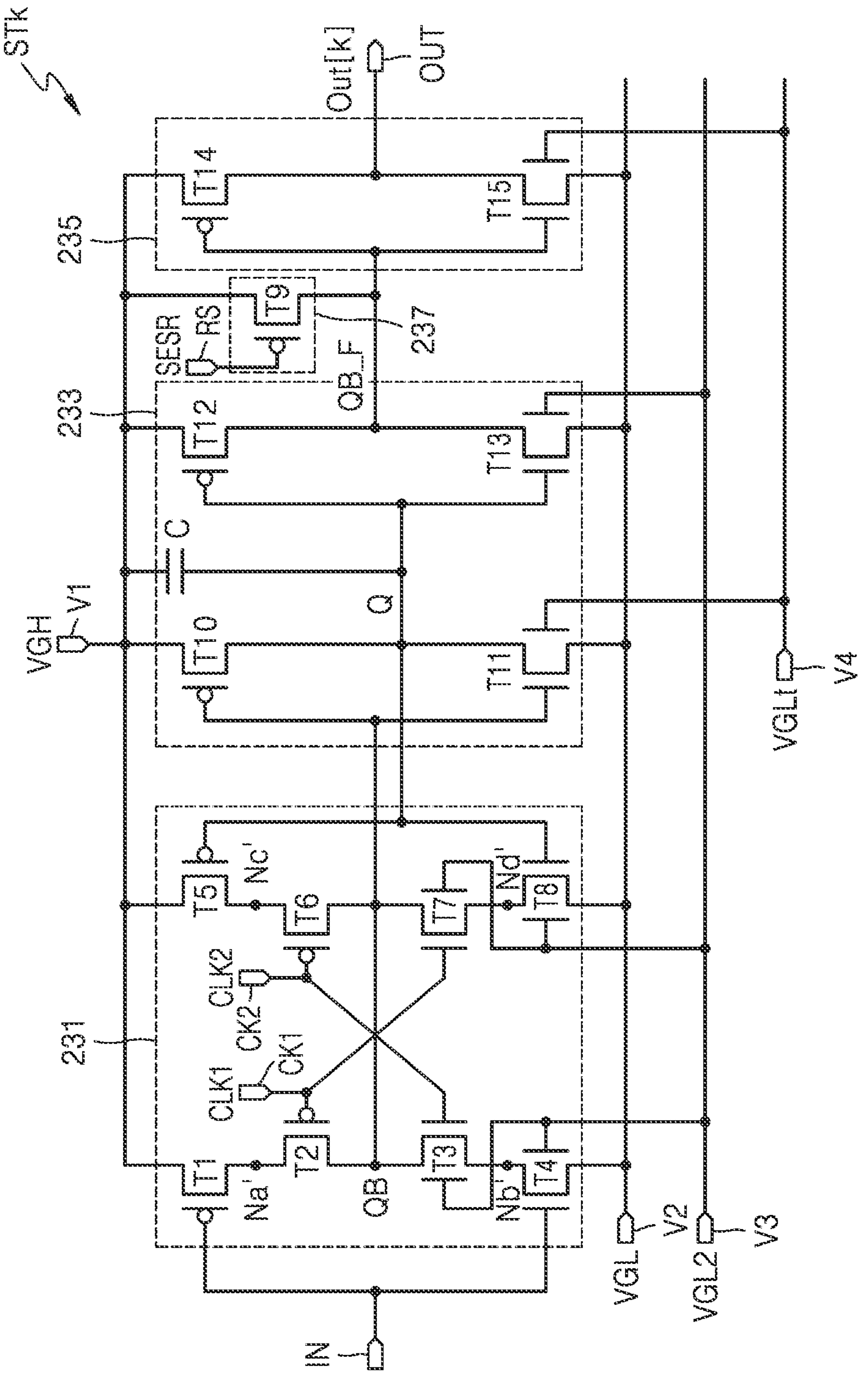

FIG. 16 is a schematic diagram illustrating a scan driver 130 according to an embodiment. FIGS. 17 and 19 are circuit diagrams illustrating examples of a stage STk included in the scan driver 130 of FIG. 16. FIG. 18 is a diagram illustrating timings of control nodes and input/output signals according to the operation of the stage STk of FIG. 16.

The scan driver 130 shown in FIG. 16 is different from the scan driver 130 shown in FIG. 3 in that a carry output terminal COUT of each of the stages ST1, ST2, ST3, ST4, . . . is omitted and a start signal applied to the input terminal IN from a second stage ST2 to a final stage is an output signal of a previous stage.

The stage STk shown in FIG. 17 is different from the stage STk shown in FIG. 13 in that the carry output terminal COUT is omitted. The stage STk shown in FIG. 19 is different from the stage STk shown in FIG. 15 in that the carry output terminal COUT is omitted.

Figure 20:
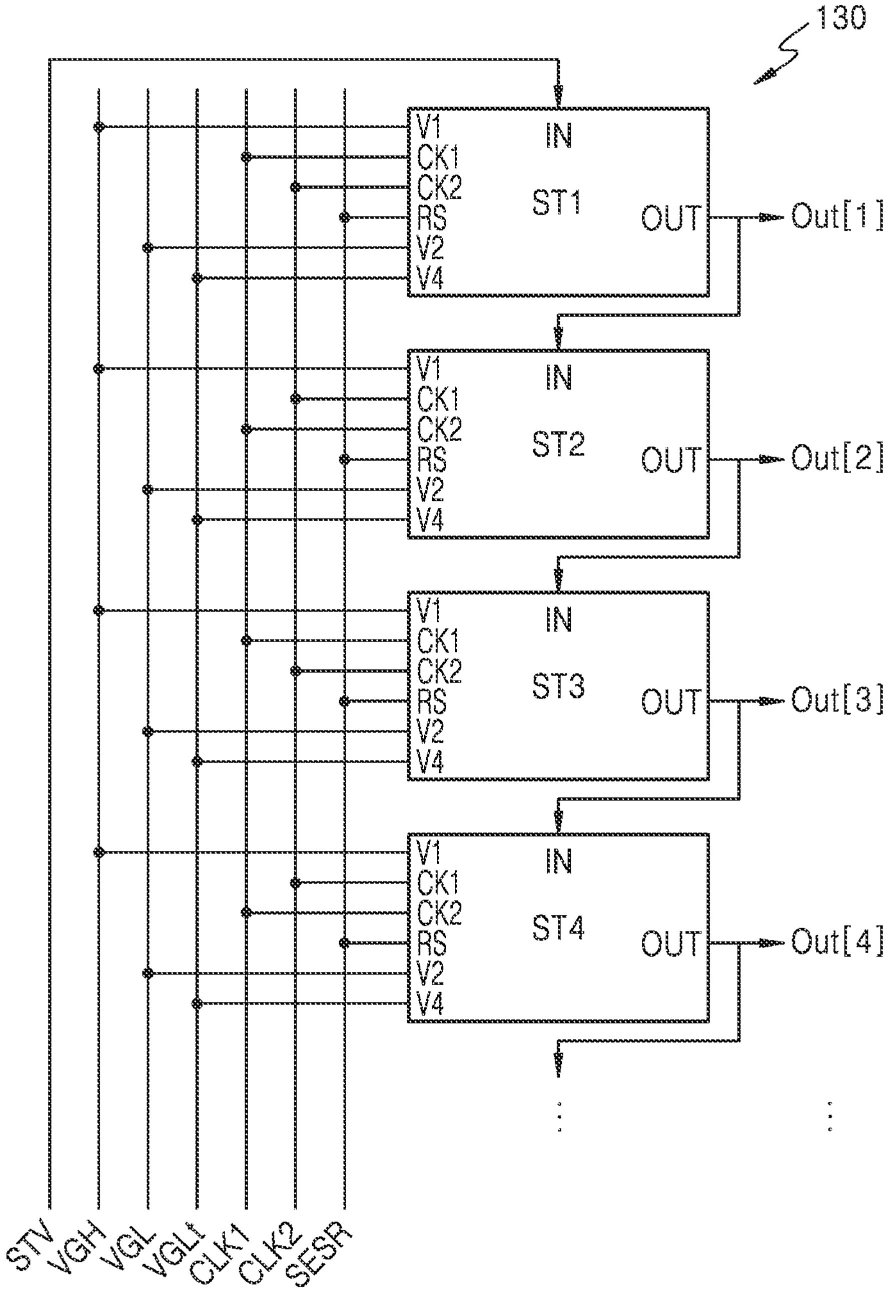
FIG. 20 is a schematic diagram illustrating a scan driver according to an embodiment.
Figure 21:
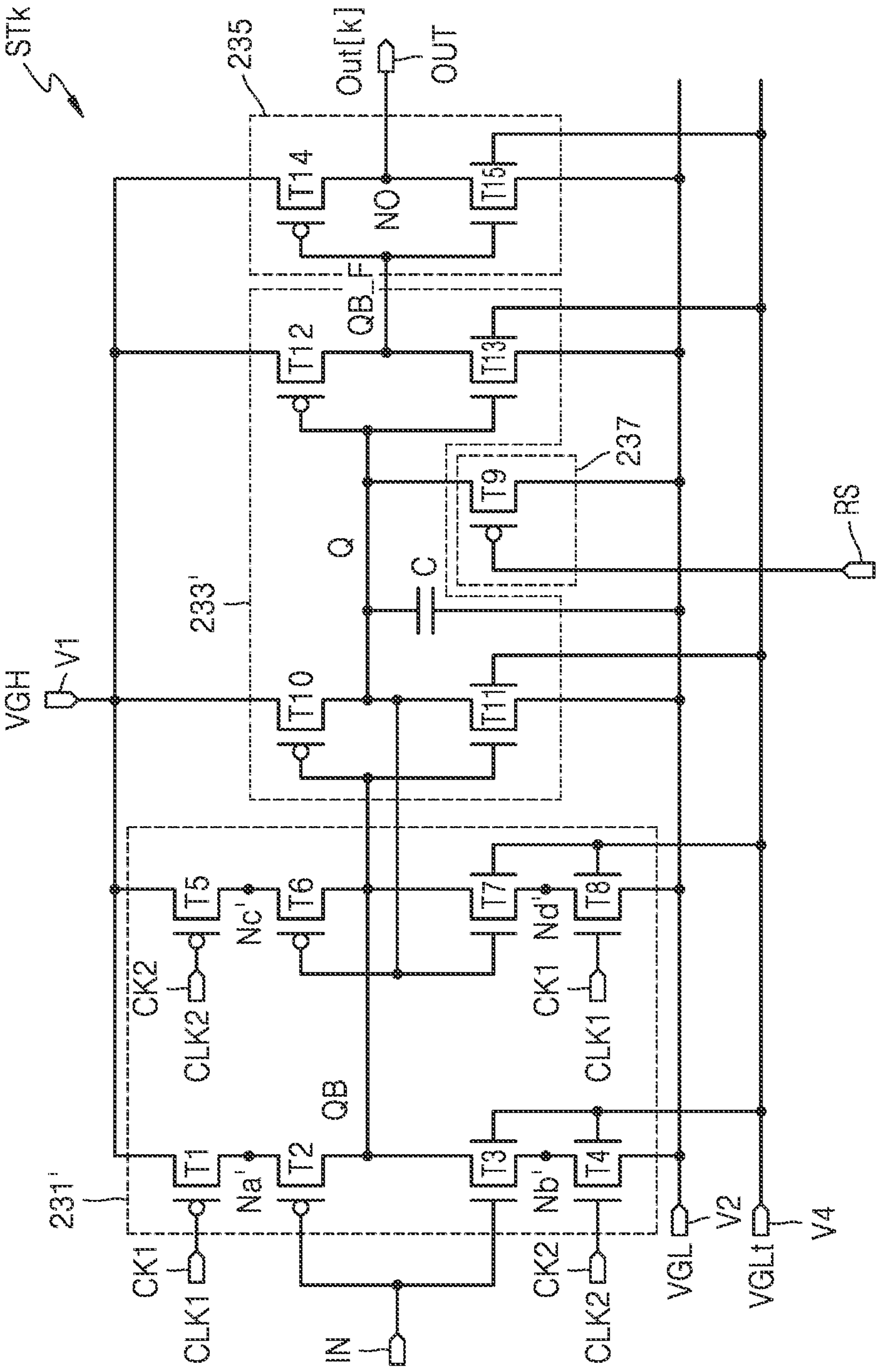
FIG. 21 is a circuit diagram illustrating an example of a stage included in the scan driver of FIG. 20.

FIG. 20 is a schematic diagram illustrating a scan driver 130 according to an embodiment. FIG. 21 is a circuit diagram illustrating an example of a stage included in the scan driver 130 of FIG. 20.

The scan driver 130 shown in FIG. 20 is different from the scan driver 130 shown in FIG. 16 in that a third voltage input terminal V3 and a carry output terminal COUT of each of the stages ST1, ST2, ST3, ST4, . . . is omitted and a start signal applied to the input terminal IN from a second stage ST2 to a final stage is an output signal of a previous stage.

The stage shown in FIG. 21 is different from the stage shown in FIG. 17 in the connection relationship of some transistors. Hereinafter, configurations and operations of the stage STk shown in FIG. 21, which are different from the configurations and operations of the stage STk shown in FIG. 17 will be mainly described.

Referring to FIG. 21, the stage STk may include a first node controller 231', a second node controller 233', and an output controller 235. The stage STk may further include a reset portion 237.

The first node controller 231' may include first to eighth transistors T1, T2, T3, T4, T5, T6, T7, and T8. The first transistor T1, the second transistor T2, the fifth transistor T5, and the sixth transistor T6 may be P-type transistors, and the third transistor T3, the fourth transistor T4, the seventh transistor T7, and the eighth transistor T8 may be N-type transistors.

The first transistor T1 may be connected between a first voltage input terminal V1 and a first node Na'. The gate of the first transistor T1 may be connected to a first clock terminal CK1.

The second transistor T2 may be connected between the first node Na' and a second control node QB. The gate of the second transistor T2 may be connected to an input terminal IN.

The first transistor T1 and the second transistor T2 may be connected in series and may be connected between the first voltage input terminal V1 and the second control node QB.

The third transistor T3 may be connected between the second control node QB and a second node Nb'. A first gate of the third transistor T3 may be connected to the input terminal IN, and a second gate of the third transistor T3 may be connected to a fourth voltage input terminal V4.

The fourth transistor T4 may be connected between the second node Nb' and a second voltage input terminal V2. A first gate of the fourth transistor T4 may be connected to a second clock terminal CK2, and a second gate of the fourth transistor T4 may be connected to the fourth voltage input terminal V4.

The third transistor T3 and the fourth transistor T4 may be connected in series and may be connected between the second voltage input terminal V2 and the second control node QB.

The fifth transistor T5 may be connected between the first voltage input terminal V1 and a third node Nc'. The gate of the fifth transistor T5 may be connected to the second clock terminal CK2.

The sixth transistor T6 may be connected between the third node Nc' and the second control node QB. The gate of the sixth transistor T6 may be connected to a first control node Q.

The fifth transistor T5 and the sixth transistor T6 may be connected in series and may be connected between the first voltage input terminal V1 and the second control node QB.

The seventh transistor T7 may be connected between the second control node QB and a fourth node Nd'. A first gate of the seventh transistor T7 may be connected to the first control node Q, and a second gate of the seventh transistor T7 may be connected to the fourth voltage input terminal V4.

The eighth transistor T8 may be connected between the fourth node Nd' and the second voltage input terminal V2. A first gate of the eighth transistor T8 may be connected to the first clock terminal CK1, and a second gate of the eighth transistor T8 may be connected to the fourth voltage input terminal V4.

The seventh transistor T7 and the eighth transistor T8 may be connected in series and may be connected between the second voltage input terminal V2 and the second control node QB.

The second node controller 233' may include tenth to thirteenth transistors T10, T11, T12, and T13 and a capacitor C. The tenth transistor T10 and the twelfth transistor T12 may be P-type transistors, and the eleventh transistor T11 and the thirteenth transistor T13 may be N-type transistors. A first gate of the thirteenth transistor T13 of the second node controller 233' may be connected to the first control node Q, and a second gate of the thirteenth transistor T13 may be connected to the fourth voltage input terminal V4. The capacitor C may be connected between the second voltage input terminal V2 and the first control node Q.

The output controller 235 may include a fourteenth transistor T14 and a fifteenth transistor T15. The fourteenth transistor T14 may be a P-type transistor, and the fifteenth transistor T15 may be an N-type transistor.

The reset portion 237 may include a ninth transistor T9. The ninth transistor T9 may be a P-type transistor. The ninth transistor T9 may be connected between the second voltage input terminal V2 and the first control node Q. The gate of the ninth transistor T9 may be connected to a reset terminal RS. The ninth transistor T9 may be turned on by a reset signal SESR having a low voltage, and thus, the first control node Q may be in a low level state. Accordingly, the output signal may be initialized to a low voltage.

While a start signal having a high voltage is applied to the input terminal IN and the third transistor T3 is turned on, the low voltage and the high voltage of the first clock signal CLK1 may be alternately applied to the first clock terminal CK1 a certain number of times, and the low voltage and the high voltage of the second clock signal CLK2 may be alternately applied to the second clock terminal CK2 a certain number of times.

The first transistor T1 may be turned on by the first clock signal CLK1 having a low voltage, and thus, the first node Na' may be in a high level state by a first voltage VGH. The third transistor T3 may be turned on by the start signal having a high voltage, and the fourth transistor T4 may be turned on by the second clock signal CLK2 having a high voltage so that the second control node QB may be in a low level state by a second voltage VGL applied to the second voltage input terminal V2. The tenth transistor T10 having a gate connected to the second control node QB may be turned on, and thus, the first control node Q may be in a high level state by the first voltage VGH applied to the first voltage input terminal V1. The thirteenth transistor T13 having a gate connected to the first control node Q may be turned on, and thus, the third control node QB_F may be in a low level state by the second voltage VGL applied to the second voltage input terminal V2. The fourteen transistor T14 having a gate connected to the third control node QB_F may be turned on so that the first voltage VGH applied to the first voltage input terminal V1 may be transferred to the output node NO, and the output signal Out[k] having a high voltage may be output from the output terminal OUT.

When the first clock signal CLK1 transitions to a high voltage, and the second clock signal CLK2 transitions to a low voltage, the fifth transistor T5 and the eighth transistor T8 may be turned on, and the seventh transistor T7 and the thirteenth transistor T13, the gates of which are connected to the first control node Q being in a high level state, may be turned on. The second control node QB may be maintained in a low level state by the turned-on seventh transistor T7 and the turned-on eighth transistor T8. The third control node QB_F may be maintained in a low level state by the turned-on thirteenth transistor T13, and the fourteenth transistor T14 may be turned on to thereby output the output signal Out[k] having a high voltage from the output terminal OUT.

While the start signal maintains a high voltage, the first clock signal CLK1 and the second clock signal CLK2 may be alternately applied as a low voltage and a high voltage, and as the operation described above is repeated, the output signal Out[k] having a high voltage may be output from the output terminal OUT.

When the start signal transitions to a low voltage, the third transistor T3 may be turned off, and the second transistor T2 may be turned on. In this case, the first transistor T1 and the fourth transistor T4 may be turned on by the first clock signal CLK1 having a low voltage and the second clock signal CLK2 having a high voltage, respectively, and the second control node QB may be in a high level state by the first voltage VGH applied to the first voltage input terminal V1. The eleventh transistor T11 having a gate connected to the second control node QB may be turned on, and thus, the first control node Q may be in a low level state by the second voltage VGL applied to the second voltage input terminal V2. The twelfth transistor T12 having a gate connected to the first control node Q may be turned on, and thus, the third control node QB_F may be in a high level state by the first voltage VGH applied to the first voltage input terminal V1. The fifteenth transistor T15 having a gate connected to the third control node QB_F may be turned on, and thus, the output signal Out[k] having a low voltage may be output from the output terminal OUT by the second voltage VGL applied to the second voltage input terminal V2.

When the first clock signal CLK1 transitions to a high voltage and the second clock signal CLK2 transitions to a low voltage, the eighth transistor T8 and the fifth transistor T5 may be turned on, and the sixth transistor T6 and the twelfth transistor T12, the gates of which are connected to the first control node Q being in a low level state, may be turned on, and thus, the second control node QB and the third control node QB_F may be maintained in a high level state by the first voltage VGH applied to the first voltage input terminal V1. The fifteenth transistor T15 having a gate connected to the third control node QB_F may be turned on to thereby output the output signal Out[k] having a low voltage from the output terminal OUT.

While the start signal maintains a low voltage, the first clock signal CLK1 and the second clock signal CLK2 may be alternately applied as a low voltage and a high voltage, and as the operation described above is repeated, the output signal Out[k] having a low voltage may be output from the output terminal OUT.

The even-numbered stage is different from the odd-numbered stage in that the second clock signal CLK2 is applied to the first clock terminal CK1 and the first clock signal CLK1 is applied to the second clock terminal CK2, and other circuit configurations and operations of the even-numbered stage are the same as those of the odd-numbered stage described with reference to FIG. 20.

In the embodiments described above, a stage includes a node controller in which an output of a transistor having a gate connected to a first control node and an output of a transistor having a gate connected to a second control node are coupled to each other, and thus, a stable scan signal may be output without a separate boost capacitor. Power consumption may also be reduced by omitting the boost capacitor. In addition, by changing the voltage level of a low voltage applied to the gate of an N-type transistor according to the threshold voltage value of the N-type transistor, a shift in the threshold voltage of the N-type transistor may be reduced, thereby improving the long-term reliability of circuits.

Each of the transistors included in the node controller of the embodiments described above may be referred to as a control transistor for controlling the voltage level state of a node.

A display device according to embodiments may be implemented as an electronic device, such as a smartphone, a mobile phone, a smart watch, a navigation device, a game machine, a TV, a vehicle head unit, a notebook computer, a laptop computer, a tablet computer, a personal media player (PMP), or a personal digital assistant (PDA). Also, the electronic device may be a flexible device.

According to embodiments, a scan driver capable of stably outputting scan signals and a display device including the scan driver may be provided. Effects of the disclosure are not limited to the above-described effects, and may be variously expanded without departing from the spirit of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A scan driver comprising a plurality of stages,
wherein each of the plurality of stages includes:
a first node controller connected between an input terminal to which a start signal is applied and a first control node and configured to control a voltage level of the first control node with a clock signal;
a second node controller configured to control a voltage level of a second control node according to the voltage level of the first control node; and
an output controller configured to output an output signal having a first voltage level or a second voltage level according to the voltage level of the second control node, and
wherein the second node controller includes:
a first control transistor connected between a first voltage input terminal, to which a first voltage of the first voltage level is applied, and a first node and having a gate connected to the second control node;
a second control transistor connected between a second voltage input terminal, to which a second voltage of the second voltage level is applied, and the first node and having a first gate connected to the second control node;
a third control transistor connected between the first voltage input terminal and the second control node and having a gate connected to the first control node; and
a fourth control transistor connected between the second voltage input terminal and the second control node and having a first gate connected to the first control node.

2. The scan driver of claim 1, wherein a second gate of the fourth control transistor is connected to a third voltage input terminal to which a third voltage of the second voltage level is applied, a second gate of the second control transistor is connected to a fourth voltage input terminal to which a fourth voltage of the second voltage level is applied, and the third voltage is greater or less than the second voltage.

3. The scan driver of claim 2, wherein the fourth voltage varies with time.

4. The scan driver of claim 1, wherein the first node controller includes:
a fifth control transistor connected between the input terminal and the first control node and having a gate connected to a first clock terminal;
a sixth control transistor connected between the input terminal and the first control node and having a first gate connected to a second clock terminal;
a seventh control transistor connected between the first node and a second node connected to the first control node and having a first gate connected to the first clock terminal; and
an eighth control transistor connected between the first node and the second node and having a gate connected to the second clock terminal.

5. The scan driver of claim 4, wherein a second gate of the sixth control transistor and a second gate of the seventh control transistor are connected to a third voltage input terminal to which a third voltage of the second voltage level is applied, and the third voltage is greater or less than the second voltage.

6. The scan driver of claim 4, wherein an inversion timing of a first clock signal applied to the first clock terminal coincides with an inversion timing of a second clock signal applied to the second clock terminal.

7. The scan driver of claim 1, wherein the first node controller includes:
a fifth control transistor connected between the input terminal and the first control node and having a gate connected to a clock terminal;
a sixth control transistor connected between the input terminal and the first control node and having a first gate connected to a third node;
a seventh control transistor connected between the first node and a second node connected to the first control node and having a first gate connected to the clock terminal;
an eighth control transistor connected between the first node and the second node and having a gate connected to the third node;

a ninth control transistor connected between the first voltage input terminal and the third node and having a gate connected to the clock terminal; and a tenth control transistor connected between the second voltage input terminal and the third node and having a first gate connected to the clock terminal.

8. The scan driver of claim 7, wherein a second gate of the sixth control transistor, a second gate of the seventh control transistor, and a second gate of the tenth control transistor are connected to a third voltage input terminal to which a third voltage of the second voltage level is applied, and the third voltage is greater or less than the second voltage.

9. The scan driver of claim 7, wherein the output signal has the first voltage level at a timing when a clock signal applied to the clock terminal transitions from the first voltage level to the second voltage level.

10. The scan driver of claim 1, wherein the first node controller includes:

a fifth control transistor connected between the input terminal and the first control node and having a gate connected to a third node;

a sixth control transistor connected between the input terminal and the first control node and having a first gate connected to a clock terminal;

a seventh control transistor connected between the first node and a second node connected to the first control node, and having a first gate connected to the third node;

an eighth control transistor connected between the first node and the second node and having a gate connected to the clock terminal;

a ninth control transistor connected between the first voltage input terminal and the third node and having a gate connected to the clock terminal; and a tenth control transistor connected between the second voltage input terminal and the third node and having a first gate connected to the clock terminal.

11. The scan driver of claim 10, wherein a second gate of the sixth control transistor, a second gate of the seventh control transistor, and a second gate of the tenth control transistor are connected to a third voltage input terminal to which a third voltage of the second voltage level is applied, and the third voltage is greater or less than the second voltage.

12. The scan driver of claim 10, wherein the output signal has the first voltage level at a timing when a clock signal applied to the clock terminal transitions from the second voltage level to the first voltage level.

13. The scan driver of claim 1, wherein a carry output terminal is connected to the first node.

14. The scan driver of claim 1, wherein the output controller includes:

a pull-up transistor connected between the first voltage input terminal and an output terminal and having a gate connected to the second control node; and a pull-down transistor connected between the second voltage input terminal and the output terminal and having a first gate connected to the second control node and a second gate connected to a fourth voltage input terminal to which a fourth voltage of the second voltage level is applied.

15. A scan driver comprising a plurality of stages, wherein each of the plurality of stages includes:

a first node controller connected between a first voltage input terminal, to which a first voltage of a first voltage level is applied, and a second voltage input terminal, to which a second voltage of a second voltage level is applied and configured to control voltage levels of a first control node and a second control node by using a start signal applied to an input terminal;

a second node controller configured to control a voltage level of a third control node according to the voltage level of the first control node; and an output controller configured to output an output signal having the first voltage level or the second voltage level according to the voltage level of the third control node, and wherein the second node controller includes:

a first control transistor connected between the first voltage input terminal and the first control node and having a gate connected to the second control node;

a second control transistor connected between the second voltage input terminal and the first control node and having a first gate connected to the second control node;

a third control transistor connected between the first voltage input terminal and the third control node and having a gate connected to the first control node; and a fourth control transistor connected between the second voltage input terminal and the third control node and having a first gate connected to the first control node.

16. The scan driver of claim 15, wherein a second gate of the fourth control transistor is connected to a third voltage input terminal to which a third voltage of the second voltage level is applied, a second gate of the second control transistor is connected to a fourth voltage input terminal to which a fourth voltage of the second voltage level is applied, and the third voltage is less than the second voltage and the fourth voltage varies with time.

17. The scan driver of claim 15, wherein the first node controller includes:

a fifth control transistor connected between the first voltage input terminal and a first node and having a gate connected to the input terminal;

a sixth control transistor connected between the first node and the second control node and having a gate connected to a first clock terminal;

a seventh control transistor connected between the second control node and a second node and having a first gate connected to a second clock terminal;

an eighth control transistor connected between the second node and the second voltage input terminal and having a first gate connected to the input terminal;

a ninth control transistor connected between the first voltage input terminal and a third node and having a gate connected to the first control node;

a tenth control transistor connected between the third node and the second control node and having a gate connected to the second clock terminal;

an eleventh control transistor connected between the second control node and a fourth node and having a first gate connected to the first clock terminal; and a twelfth control transistor connected between the second voltage input terminal and the fourth node and having a first gate connected to the first control node.

18. The scan driver of claim 17, wherein a second gate of the seventh control transistor, a second gate of the eighth control transistor, a second gate of the eleventh control transistor, and a second gate of the twelfth control transistor are connected to a third voltage input terminal to which a third voltage of the second voltage level is applied, and the third voltage is less than the second voltage.

19. The scan driver of claim 15, wherein the first node controller includes:

a fifth control transistor connected between the first voltage input terminal and a first node and having a gate connected to a first clock terminal;

a sixth control transistor connected between the first node and the second control node and having a gate connected to the input terminal;

a seventh control transistor connected between the second control node and a second node and having a first gate connected to the input terminal;

an eighth control transistor connected between the second node and the second voltage input terminal and having a first gate connected to a second clock terminal;

a ninth control transistor connected between the first voltage input terminal and a third node and having a gate connected to the second clock terminal;

a tenth control transistor connected between the third node and the second control node and having a gate connected to the first control node;

an eleventh control transistor connected between the second control node and a fourth node and having a first gate connected to the first control node; and a twelfth control transistor connected between the second voltage input terminal and the fourth node and having a first gate connected to the first clock terminal.

20. The scan driver of claim 19, wherein a second gate of the seventh control transistor, a second gate of the eighth control transistor, a second gate of the eleventh control transistor, and a second gate of the twelfth control transistor are connected to a fourth voltage input terminal to which a fourth voltage of the second voltage level is applied, and the fourth voltage varies with time.

* * * * *